US008473397B2

(12) United States Patent
Gardner et al.

(10) Patent No.: US 8,473,397 B2
(45) Date of Patent: *Jun. 25, 2013

(54) FINANCIAL PORTFOLIO MANAGEMENT SYSTEM AND METHOD

(75) Inventors: L. Patrick Gardner, Manchester, MA (US); Ellen L. Dickau, Carlisle, MA (US); Martin Dickau, Carlisle, MA (US); James M. Carney, Manchester, MA (US)

(73) Assignee: Byallaccounts, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,913

(22) Filed: Jun. 5, 2012

(65) Prior Publication Data

US 2012/0265708 A1 Oct. 18, 2012

Related U.S. Application Data

(63) Continuation of application No. 12/618,253, filed on Nov. 13, 2009, now Pat. No. 8,219,473, which is a continuation of application No. 09/881,959, filed on Jun. 15, 2001, now Pat. No. 7,640,200.

(60) Provisional application No. 60/217,443, filed on Jul. 10, 2000.

(51) Int. Cl.
*G06Q 40/00* (2006.01)
(52) U.S. Cl.
USPC .............................. 705/36 R; 705/35; 705/37
(58) Field of Classification Search
USPC ...................................... 705/35, 36, 37, 36 R
See application file for complete search history.

(56) References Cited

U.S. PATENT DOCUMENTS

| | | | |
|---|---|---|---|
| 5,901,287 A | 5/1999 | Bull et al. |
| 5,911,136 A | 6/1999 | Atkins |
| 5,995,943 A | 11/1999 | Bull et al. |
| 6,064,990 A | 5/2000 | Goldsmith |
| 6,199,077 B1 | 3/2001 | Inala et al. |
| 6,208,975 B1 | 3/2001 | Bull et al. |
| 6,233,586 B1 | 5/2001 | Chang et al. |
| 6,263,342 B1 | 7/2001 | Chang et al. |
| 6,278,993 B1 | 8/2001 | Kumar et al. |
| 6,292,789 B1 | 9/2001 | Schutzer |
| 6,317,783 B1 | 11/2001 | Freishtat et al. |
| 6,405,245 B1 | 6/2002 | Burson et al. |
| 6,412,073 B1 | 6/2002 | Rangan |
| 6,438,575 B1 | 8/2002 | Khan et al. |
| 6,442,590 B1 | 8/2002 | Inala et al. |
| 6,477,565 B1 | 11/2002 | Daswani et al. |

(Continued)

OTHER PUBLICATIONS

Aquais, "Risk systems can help banks service the slumps," *American Banker*, 160(191):171(1), 1994.

(Continued)

*Primary Examiner* — Nga B. Nguyen
(74) *Attorney, Agent, or Firm* — Brown Rudnick LLP

(57) ABSTRACT

A financial portfolio management system operable in a network environment can be configured to gather financial information from a plurality of sources over an electronic network and intelligently aggregate the information into a financial portfolio viewable by a client. The client can determine which accounts should be included in the portfolio. The system uses web crawling, parsing, or spidering technology to update the portfolio information. The system provides one platform that conveys financial information from a variety of accounts held at several different financial institutions.

32 Claims, 17 Drawing Sheets

U.S. PATENT DOCUMENTS

| | | | |
|---|---|---|---|
| 6,510,451 | B2 | 1/2003 | Wu et al. |
| 6,513,019 | B2 | 1/2003 | Lewis |
| 6,517,587 | B2 | 2/2003 | Satyavolu et al. |
| 6,567,850 | B1 | 5/2003 | Freishtat et al. |
| 6,578,015 | B1 | 6/2003 | Haseltine et al. |
| 6,601,044 | B1 | 7/2003 | Wallman |
| 6,604,113 | B1 | 8/2003 | Kenyon et al. |
| 6,633,910 | B1 | 10/2003 | Rajan et al. |
| 6,725,425 | B1 | 4/2004 | Rajan et al. |
| 6,738,804 | B1 | 5/2004 | Lo |
| 6,802,042 | B2 | 10/2004 | Rangan et al. |
| 6,842,782 | B1 | 1/2005 | Malik et al. |
| 6,859,212 | B2 | 2/2005 | Kumar et al. |
| 6,865,680 | B1 | 3/2005 | Wu et al. |
| 6,871,220 | B1 | 3/2005 | Rajan et al. |
| 6,993,505 | B1 | 1/2006 | Katz et al. |
| 7,013,310 | B2 | 3/2006 | Messing et al. |
| 7,039,656 | B1 | 5/2006 | Tsai et al. |
| 7,085,997 | B1 | 8/2006 | Wu et al. |
| 7,155,508 | B2 | 12/2006 | Sankuratripati et al. |
| 7,200,804 | B1 | 4/2007 | Khavari et al. |
| 7,203,845 | B2 | 4/2007 | Sokolic et al. |
| 7,225,464 | B2 | 5/2007 | Satyavolu et al. |
| 7,321,874 | B2 | 1/2008 | Dilip et al. |
| 7,321,875 | B2 | 1/2008 | Dilip et al. |
| 7,383,223 | B1 | 6/2008 | Dilip et al. |
| 7,505,937 | B2 | 3/2009 | Dilip et al. |
| 7,536,340 | B2 | 5/2009 | Dheer et al. |
| 7,606,752 | B2 | 10/2009 | Hazlehurst et al. |
| 8,219,473 | B2 * | 7/2012 | Gardner et al. ............... 705/35 |
| 2001/0016034 | A1 | 8/2001 | Singh et al. |
| 2001/0023414 | A1 | 9/2001 | Kumar et al. |
| 2001/0032182 | A1 | 10/2001 | Kumar et al. |
| 2001/0051907 | A1 | 12/2001 | Kumar et al. |
| 2002/0015480 | A1 | 2/2002 | Daswani et al. |
| 2002/0019810 | A1 | 2/2002 | Kumar et al. |
| 2002/0023108 | A1 | 2/2002 | Daswani et al. |
| 2002/0059369 | A1 | 5/2002 | Kern et al. |
| 2002/0091635 | A1 | 7/2002 | Dilip et al. |
| 2002/0174048 | A1 | 11/2002 | Dheer et al. |
| 2003/0187925 | A1 | 10/2003 | Inala et al. |
| 2003/0236728 | A1 | 12/2003 | Sunderji et al. |
| 2004/0078423 | A1 | 4/2004 | Satyavolu et al. |
| 2004/0236653 | A1 | 11/2004 | Sokolic et al. |
| 2005/0187867 | A1 | 8/2005 | Sokolic et al. |
| 2005/0198377 | A1 | 9/2005 | Ferguson et al. |
| 2005/0216824 | A1 | 9/2005 | Ferguson et al. |
| 2006/0047724 | A1 | 3/2006 | Messing et al. |
| 2006/0101323 | A1 | 5/2006 | Satyavolu |
| 2006/0136595 | A1 | 6/2006 | Satyavolu |
| 2006/0195398 | A1 | 8/2006 | Dheer et al. |
| 2007/0067239 | A1 | 3/2007 | Dheer et al. |
| 2007/0100748 | A1 | 5/2007 | Dheer et al. |
| 2008/0015982 | A1 | 1/2008 | Sokolic et al. |
| 2008/0082454 | A1 | 4/2008 | Dilip et al. |
| 2008/0086403 | A1 | 4/2008 | Dilip et al. |
| 2008/0086426 | A1 | 4/2008 | Dilip et al. |
| 2008/0275816 | A1 | 11/2008 | Hazlehurst |
| 2008/0288376 | A1 | 11/2008 | Panthaki et al. |
| 2008/0288400 | A1 | 11/2008 | Panthaki et al. |
| 2008/0301022 | A1 | 12/2008 | Patel et al. |
| 2008/0301023 | A1 | 12/2008 | Patel et al. |
| 2008/0301042 | A1 | 12/2008 | Patzer |
| 2009/0024505 | A1 | 1/2009 | Patel et al. |
| 2009/0076950 | A1 | 3/2009 | Chang et al. |
| 2009/0271854 | A1 | 10/2009 | Hazlehurst et al. |
| 2009/0276359 | A1 | 11/2009 | Panthaki et al. |

OTHER PUBLICATIONS

"IT Report: Getting into IT—final Accounts Production," *Accountancy*, p. 50, 1999.

Kassel, "One Source Tools to Use," *Searcher*, 7(4):27(1), 1999.

Levinsohn, "Online brokerage, the new core account?" *ABA Banking Journal*, 91(9):34-42, 1999.

* cited by examiner

FIG. 10

| Account Name | Exec Date | Type | Holding | Total | Units |
|---|---|---|---|---|---|
| Fidelity IRA | Jun 15, 2000 | Buy | | $208.26 | 11.7 |
| Fidelity IRA | Jun 15, 2000 | Buy | | $1,596.07 | 33.3 |
| Fidelity IRA | Jun 15, 2000 | Buy | FID NEW MILLENIUM | $1596.07 | 33.3 |
| Fidelity IRA | Jun 15, 2000 | Buy | Fidelity Freedom Income | $208.26 | 11.7 |
| Fidelity IRA | Jun 30, 2000 | Buy | | $208.17 | 9.97 |
| Fidelity IRA | Jun 30, 2000 | Buy | FID NEW MILLENIUM | $1595.92 | 51.25 |
| Fidelity IRA | Jun 30, 2000 | Buy | Fidelity Freedom Income | $1595.92 | 51.25 |
| Fidelity IRA | Jun 30, 2000 | Buy | | $208.17 | 9.97 |
| Gillette 401k | Jun 30, 2000 | Reinvestment | | $21.98 | 1 |

Transaction Details

Fidelity IRA ( Crestar Bank )
Description: FFFAX Contribution
Transaction Name:
Execution Date: Jun 15, 2000    Settlement Date: Jun 15, 2000    Type: Buy
Cash Flow: $0.00    Number of Units: 11.7    Unit Price: $17.80

Submit Feedback

FIG. 15 portfolios setup  DEMO DEMO  ByAllAccounts  help | logout wizard | editor
personal  portfolios  assets  watch list  alerts ☑ Holding's lifetime return is less than [15]% or greater than [25]%

☐ Security price changes by +/- [25]% in a single day.

☑ Security reaches a new 52 week high or 52-week low

☑ Portfolio allocation: any holding exceeds its target market value, or the actual market value for an asset class is over/under target by [15]%

Define detailed alerts on individual securities: [detailed alerts]

Email Alerts
☐ Send alerts via email to salesman@byallaccounts.com

[edit addresses...]

1500

FINANCIAL PORTFOLIO MANAGEMENT SYSTEM AND METHOD

CROSS REFERENCE TO RELATED APPLICATIONS

This application is a continuation of U.S. patent application Ser. No. 12/618,253 filed on Nov. 13, 2009, which is a continuation of U.S. patent application Ser. No. 09/881,959 filed on Jun. 15, 2001, which claims the benefit of priority to U.S. Provisional Patent Application No. 60/217,443, filed on Jul. 10, 2000. The entirety of each of the above-referenced patent applications is hereby incorporated by reference.

FIELD OF THE INVENTION

The present invention relates generally to data gathering and management using communication networks, such as, the Internet. More particularly, an exemplary embodiment of the present invention relates to a system for and method of managing financial portfolios over a communication network.

BACKGROUND OF THE INVENTION

The tremendous growth of technology has positively affected the growth of financial markets. For example, technologies, such as, communication systems and networks have enabled investors to access a veritable plethora of information and carry out a variety of transactions involving financial markets. Such financial information can be gathered, distributed, and acted upon much faster and more efficiently than ever before. Prior to communication systems and networks, such as, the Internet, mechanisms for gathering and consolidating information from financial institutions were slow and inefficient.

Even today, financial institutions do not use a single standard interface, data format, or communication protocol to provide and exchange financial data on-line. Investors who want a single source of portfolio information have to move all of their assets to a single large investment industry vendor. However, such large vendors may not necessarily offer simple, easy access and a single source for financial information. Furthermore, despite the availability of "one-shop" institutions, many investors do not want to use a single institution because diversification across many institutions allows investors to get the "best" offerings from a variety of vendors.

Thus, as the marketplace shifts toward greater control by the self-directed investor, there is a need to provide financial vendors with tools and services that attract and retain investors. Further, there is a need for vendors to provide investors with the ability to automatically gather financial information from any number of financial institutions. Even further, there is a need for investor-oriented portfolio data consolidation.

Heretofore, conventional computer applications have been commercially available which provide what can be called either desktop financial packages or financial statement consolidators. For example, desktop financial packages, such as, QUICKEN sold by Intuit, Inc. of Mountain View, Calif., and MONEY or MSN INVESTOR, both sold by Microsoft Corporation of Redmond, Wash., allow users to perform calculations on financial information and present the financial information and any calculation results. However, conventional desktop financial packages are limited to only downloading information from direct data connections with individual remote locations, such as, an individual financial institution. Further, such desktop financial packages only handle specific data, formats and do little, if anything, to relate downloaded financial information.

As another example, financial statement consolidators, such as Yodlee, Inc. of Redwood City, Calif., and GreenTrack Investments of New Rochelle, N.Y., gather information about accounts and re-present that information as if the financial institutions had issued a common statement. However, such consolidators do not manipulate the information because it all has a common format before it is gathered. The financial information is only re-presented.

Thus, there is a need for a financial portfolio management system which provides access to financial information from a variety of unrelated financial sources. Further, there is a need to normalize and integrate financial information from various financial sources as to provide meaningful and accurate information. Even further, there is a need to aggregate financial information in a way that provides relationships among the financial information.

SUMMARY OF THE INVENTION

An exemplary embodiment is related to a financial portfolio management computer-implemented method for providing access to financial information of customers of financial institutions. The financial information can originate from financial sources including a number of financial institutions. This method can include the steps of gathering financial information associated with a client from the financial sources, normalizing the financial information from the financial sources into a single normalized data format, aggregating the financial information into a financial portfolio, and conveying information associated with the financial portfolio to the client. The financial sources can include at least one financial institution and the financial information is stored in at least one data format.

Another exemplary embodiment is related to a financial portfolio management system operable in a network environment. This system can include means for gathering client-specific electronic financial information from sources over an electronic network, means for normalizing the client-specific financial information into a single normalized data format, means for intelligently aggregating the client-specific financial information into a financial portfolio, and means for conveying information associated with the financial portfolio to the client. The financial information is stored in at least one of a plurality of data formats, and the financial information is associated with a client.

Another exemplary embodiment is related to a user interface configured to allow a client to view and modify financial portfolio information gathered from a plurality of financial sources. The plurality of financial sources can include a number of unrelated financial institutions. The user interface can include means for presenting financial account information of a client where the financial account information is associated with at least one of a plurality of financial institutions, means for presenting information for at least one of a plurality of financial securities, and means for presenting a value from the financial account information with at least one of a plurality of financial institutions.

Another exemplary embodiment is related to a method of enabling access to financial information over a network. This method can include using a first processing system to maintain a financial information processing unit, receiving a signal for invoking the financial information processing unit from a remote processing system via a network, and using the first processing system to operate the financial information processing unit in response to the signal. The financial information processing unit receives and processes requests for financial information associated with a number of unrelated financial institutions. The signal for invoking the financial information processing unit is transmitted from the remote processing system in response to a selection of a hypermedia link.

Another exemplary embodiment relates to a method of enabling access to financial information over a network in a local processing system. The method includes the steps of receiving a request from a first remote processing system via a network and, in response to receiving the request, transmitting to the first remote processing system over the network information for enabling the first remote processing system to output a financial information interface to a user. The financial information interface includes financial information for a number of financial institutions and is configured to enable the user to request specific financial information for a financial institution. The request is generated by the first remote processing system according to a hypermedia link provided to the first remote processing system from a separate processing system on the network.

Another exemplary embodiment relates to a processing system including a central processing unit (CPU) and a storage device coupled to a processor and having stored there information for configuring the CPU. The CPU can be configured to maintain a financial information processing unit corresponding to a single client and financial institutions maintaining accounts for the client. This financial information processing unit is configured to provide a user interface for enabling the client to submit requests for information on financial information of the financial institutions and configured to receive and process the requests. The CPU can also be configured to receive a request for invoking the financial information processing unit from a remote processing system via a network. This request is transmitted from the remote processing system in response to a selection of a hypertext link by the user. The CPU can further be configured to operate the financial information processing unit in response to the request.

Another exemplary embodiment relates to an apparatus for enabling access to financial information from a plurality of unrelated financial institutions over a network. This apparatus can include means for receiving a signal from a remote processing system via the network. This signal is transmitted from the remote processing system in response to a selection of a hypermedia link by a client. The hypermedia link can be provided by a web site of a financial institution and can specify a financial information aggregator. The apparatus can also include means for invoking a financial information processing unit in a local processing system in response to the signal. The means for invoking can include providing information for generating a user interface for access to financial information from the financial information aggregator. The financial information processing unit is configured to receive and process requests for financial information.

Other principle features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals denote like elements, and:

FIG. 10 is an exemplary user interface display conveying information from the portfolio manager of FIG. 1;

FIG. 15 is an exemplary user interface display conveying information from the portfolio manager of FIG. 1;

DETAILED DESCRIPTION OF THE EXEMPLARY EMBODIMENTS

A system for and method of managing financial portfolio information over a communication network are described. In the following description, for purposes of explanation, numerous specific details are set forth in order to provide a thorough understanding of the present invention. It will be evident, however, to one skilled in the art that the exemplary embodiments may be practiced without these specific details. In other instances, structures and devices are shown in block diagram form in order to facilitate description of the exemplary embodiments.

In one embodiment, a computer system is used which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. Thus, the embodiments described herein are not limited to any specific combination of hardware circuitry and software, nor to any particular source for the instructions executed by the computer system.

Figure 1:
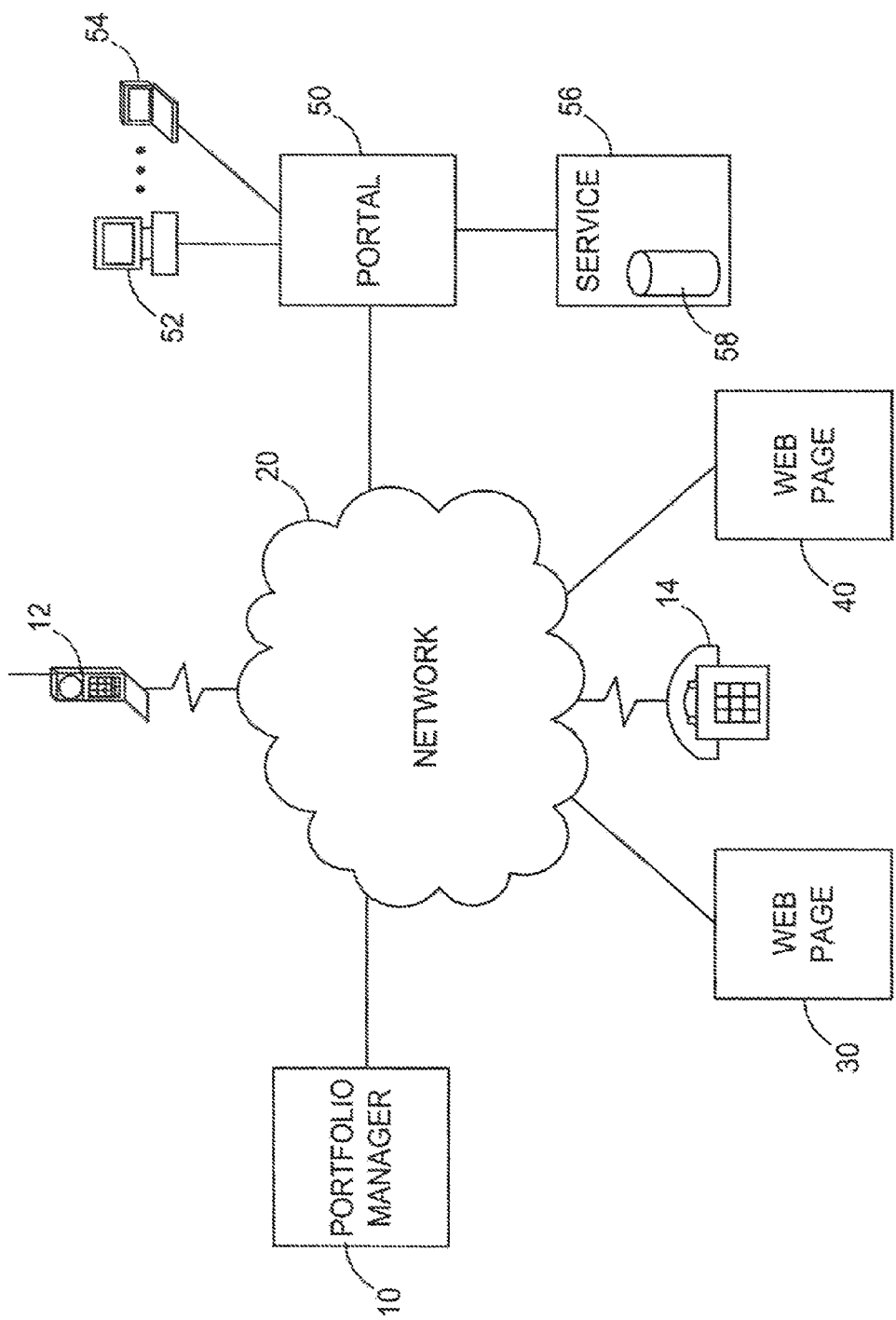
FIG. 1 is a general diagrammatical representation of a portfolio manager connected to a communications network.

FIG. 1 illustrates a connection between a portfolio manager 10 and a network 20. Portfolio manager 10 provides access to financial information available via network 20. In an exemplary embodiment, network 20 is the Internet, a worldwide network of computer networks that use various protocols to facilitate data transmission and exchange. Network 20 can use a protocol, such as, the TCP/IP network protocol or the DECnet, X.25, and UDP protocols. In alternative embodiments, network 20 is any type of network, such as, a virtual private network (VPN), an Ethernet, or a Netware network. Further, network 20 can include a configuration, such as, a wide area network (WAN) or a local area network (LAN). Network 20 preferably provides communication with Hypertext Markup Language (HTML) Web pages 30 and 40. Web pages 30 and 40 include a variety of data on a variety of Web servers. Network 20 also provides communication with a communication network portal 50 which couples computers 52 and 54 and a service 56 including a database 58 to network 20. Service 56 is any type of company, content or service provider with a connection to network 20. Database 58 is a storage medium for data and may be an optical, magnetic, or any other suitable storage medium.

Generally, portfolio manager 10 can be implemented using a computer server configured by software. Preferably, the server includes read/write memory, such as, disc drives and other storage. A customer or client can access portfolio manager 10 via a web page 30 or 40 which is conveyed to the client at computer 52 or 54. Computers 52 or 54 can be any type of computing device, including work stations, laptops, notebooks, personal digital assistants (PDAs), cell phones, beepers, or other equipment capable of communication with network 20. In another embodiment, portfolio manager 10 can be accessed via telephones, such as, a cell phone 12 or a standard telephone 14. Other user interface platforms may also be provided for using portfolio manager 10. Such user interface platforms include, for example, WAP (wireless application protocol) and web interfaces.

Advantageously, portfolio manager 10 provides a portfolio management service that draws investors or their representatives to web sites of financial service vendors, such as, asset managers, brokerage firms, information portals, and research firms. Portfolio manager 10 enables investors or their representatives to work with data from all on-line accounts within a single managed software application. Further, portfolio manager 10 benefits financial service vendors by providing needed comprehensive financial planning and analysis tools to web sites of financial service vendors. These added tools result in greater attraction and retention of investors and provides a basis for which investors will frequent the web site of a vendor.

In an exemplary embodiment, portfolio manager 10 is embedded in the web site of a financial vendor. As such, portfolio manager 10 can help attract and retain investors to the web site of the financial vendor, significantly increasing the frequency, duration, and quality of visits by the investor to the web site.

In an exemplary embodiment, portfolio manager 10 employs web crawling and parsing technology to obtain data from other web sites and automatically updates portfolios on a daily or more frequent basis. Portfolio manager 10 gathers information from a variety of institutions, whether or not those institutions support a standard data format. Such information is encrypted and securely stored at a hosting facility of portfolio manager 10. Advantageously, the parsing technology permits portfolio manager 10 to support a variety of aggregation needs without special arrangements or prior approval from financial vendors.

In an exemplary embodiment, portfolio manager 10 includes an interface implemented as a JAVA applet. The applet provides quick delivery of information to the client and no loss of context when switching between data views. The applet is also designed to accommodate vendor web site color schemes and branding. The applet can also be configured with hypertext links to vendor tools/web sites and can also be configured to pass security, position, account, and portfolio information to the application or page at the other end of the hypertext link, integrating the applications and allowing them to cooperate.

Portfolio manager 10 can include a sophisticated web crawler that gathers account data from financial institutions by parsing data from financial institutions, including data in formats, such as, Hypertext Markup Language (HTML), Open Financial Exchange (OFX), Quicken Interchanged Format (QIF), and ASCII files having tab- or comma-delimited values (e.g., a format suitable for importing into spreadsheet applications). Portfolio manager 10 can also directly connect to data servers, such as OFX servers and back-office accounting systems, without relying on web crawling or similar techniques.

Figure 2:
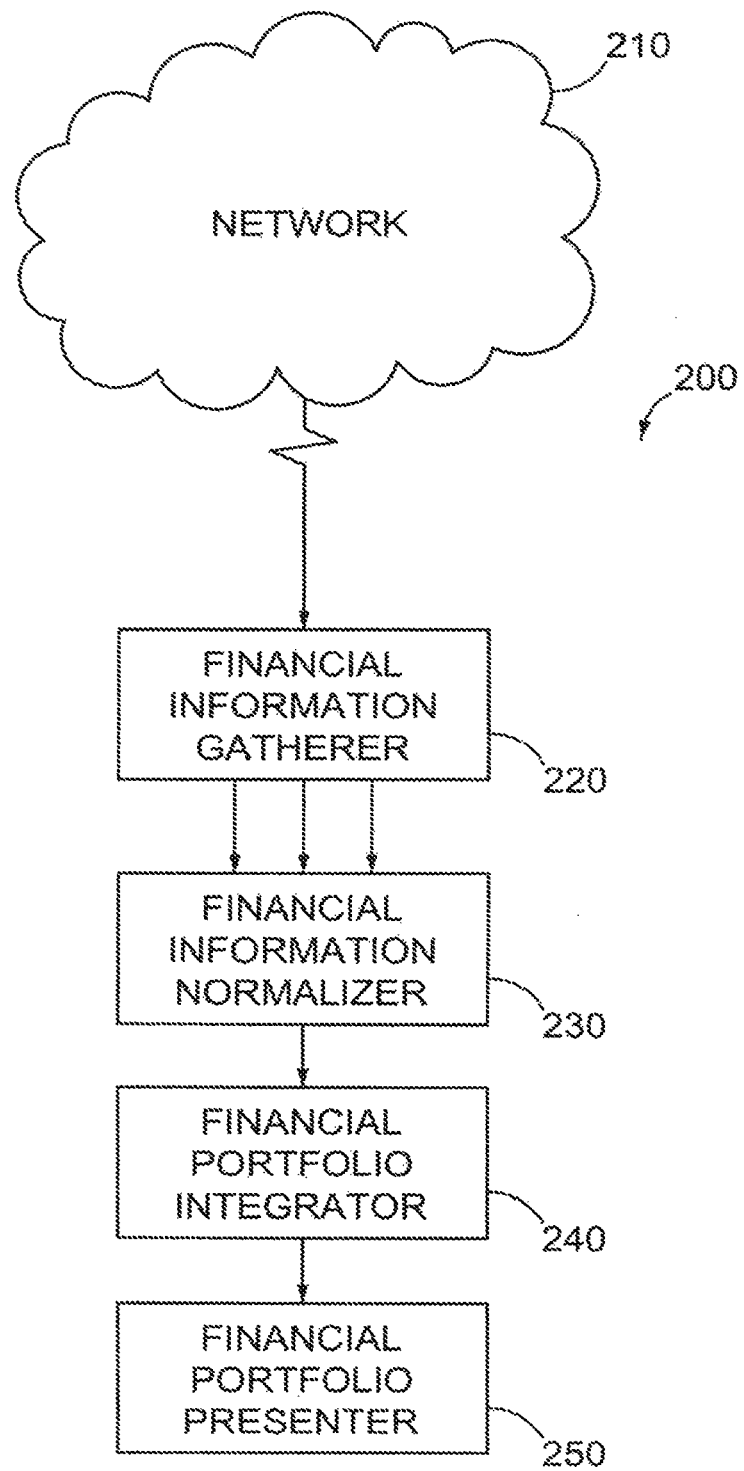
FIG. 2 is a general functional block diagram of an exemplary embodiment of the portfolio manager of FIG. 1.

FIG. 2 illustrates a general functional block diagram 200 of portfolio manager 10 (described with reference to FIG. 1), in accordance with another exemplary embodiment. As shown in diagram 200, data network 210 is communicatively connected to a financial information gatherer 220. Financial information gatherer 220 can be a computer program configured to automatically retrieve financial information over network 20. Alternatively, financial information gatherer 220 can be a person who receives paper statements or views a web site and transcribes the data.

Financial information gatherer 220 receives financial information from any of a variety of financial institutions. For example, financial institutions can include credit unions, banking institutions, stock exchanges, portfolio managing companies, or any of a variety of other institutions which may provide a source for financial information. In an exemplary embodiment, financial information from different financial institutions can be available in different data formats. Different data formats means that financial information may be stored in HTML, QIF, or other data structure formats.

Financial information gatherer 220 can obtain a variety of different data or information from different account types and in a variety of different file transfer formats. Table 1 below provides example financial sources and corresponding example account types, data, and file transfer formats.

TABLE 1

| Financial Source | Account Types | Data Collected | File Transfer Format |
|---|---|---|---|
| Retail Banking | Checking | Balances | OFX |
| | Savings | Transactions | QIF |
| | Money Market | | HTML |
| | CD | | |
| | Cash Reserve | | |
| Retail | Trading | Holdings | OFX |
| Asset | Shareholder | Balances | HTML |
| Management | Plan Participant | Transactions | |
| Trusts/Wealth | Trusts | Holdings | CSV, etc |
| Management | Private Client | Balances | HTML |
| | Private Banking | Transactions | |

Financial information gatherer 220 communicates financial information to a financial information normalizer 230. Financial information normalizer 230 receives raw financial information in a variety of different formats and converts the raw financial information into a normalized format. A normalized format is one which financial information from different sources is nevertheless consistent.

By way of example, as an exchange standard, the OFX data format defines how the "total" for a buy or sell transaction is identified, but it imposes no limits on the amount itself (e.g., is that total positive or negative). Similar situations exist with balances and with transaction ° identification. For instance, OFX defines a means to report balances, but does not require that the actual cash in an account be identified or reported in any specific way. Further, OFX defines a way for transactions to be given unique identifiers, but does not require that the financial institution use the same identifier for the transaction each time the transaction is retrieved. The OFX scope is also limited to the retail banking and retail asset management arenas. OFX makes no provision for more sophisticated financial issues, such as, position cost basis, tax lot identification, or the division between principal and income portions of a trust. Furthermore, even where OFX is well-defined, actual usage may deviate from OFX guidelines. Advantageously, portfolio manager 10 can work with such deviations to normalize and integrate all available financial data.

Normalization by financial information normalizer 230 takes elements of the raw data and assigns them to appropriate places or "positions" in a data model. This normalization process largely "standardizes" the non-standard formats, while also addresses some of the issues inherent in the standard formats.

Financial information normalizer 230 communicates the normalized financial information to a financial portfolio integrator 240. Financial portfolio integrator 240 collects financial information associated with a client into a portfolio. A plurality of financial portfolios can be provided. Such portfolios can include security holdings, savings and checking information, mutual funds, and other financial data. Financial portfolio integrator 240 can communicate a portfolio to a financial portfolio presenter 250 for conveyance to the client. For example, the portfolio can be conveyed to the client via displays, such as, the displays described with reference to FIGS. 6-15.

In an exemplary embodiment, financial portfolio integrator 240 uses a series of heuristics and algorithms to evaluate the financial data, respond to inconsistencies and gaps, and combine that data with other sources of information (e.g., third-party data sources, previously retrieved information, and user-supplied/manual input) to produce a complete data picture. Preferably, the integration process learns over time, and is adapted to the idiosyncrasies of new financial institution data sources as they are brought on board.

Advantageously, financial portfolio integrator 240 processes data into richer, more consistent formats. Such integration can involve interpretation of free-form data to answer questions, such as, to what instrument does the data refer; what kind of activity does it represent; and what are the relevant values? Integration can also involve reconciliation, answering questions, such as, is this "real" account information or an error; has this information been seen before; and how does this relate to everything else? Integration can involve adjustments, answering questions, such as, what are the implications for other positions; and what are the implications for cash flows?

Financial portfolio integrator 240 decide how normalized data fits into the data model of portfolio manager 10. For example, over 18 terms are used to indicate a "buy" transaction. These can include "automatic investment", "automatic purchase", "BOT", "bought", "buy", "contribution", "direct investment", "direct purchase", "EECON", "invested", "investment", "money fund sweep", and other terms. Financial portfolio integrator 240 identifies differences in semantics to avoid loss of critical information and is instrumented to detect and report situations where decisions cannot be made or where those decisions appear to be incorrect based on other data available from other sources.

Financial portfolio integrator 240 applies business logic, interpreting and categorizing financial information, enabling portfolio manager 10 to provide value-added portfolio management tools. Examples of business logic can include asset class categorization, sub-asset class categorization, comparison of actual to target allocation, computation of allocation adjustment, personal return calculations, net worth history, e-mail alerts (e.g., daily security activity, holding "issues"), and portfolio metrics (e.g., portfolio level return; portfolio risk/volatility).

Advantageously, the process described with reference to FIG. 2 automatically brings together the financial information data of one client from any of a multitude of financial institutions, regardless of the data formats used by the financial institutions and regardless of the relationships between financial institutions.

Figure 3:
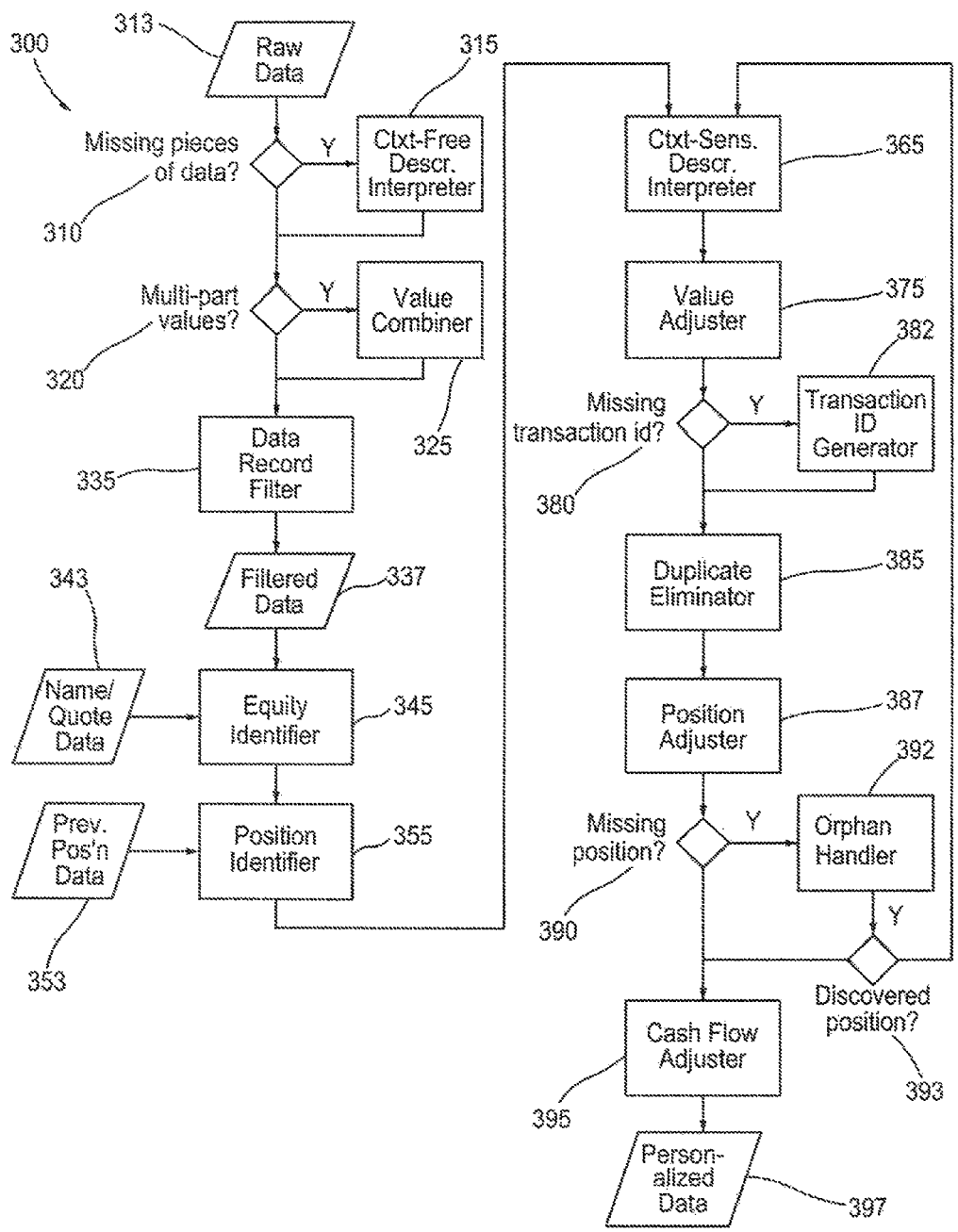
FIG. 3 is a flow diagram of steps in a financial portfolio integration process in accordance with an exemplary embodiment.

FIG. 3 illustrates a flow diagram 300 of exemplary steps in a financial portfolio integration process. Flow diagram 300 depicts one process by which financial portfolio integrator 240 described with reference to FIG. 2 operates. In an exemplary embodiment, a step 310 is performed in which raw or parsed financial data 313 is examined to determine whether there are missing pieces of data. If there are missing pieces of data, a context-free description interpreter 315 is engaged.

Context-free description interpreter 315 applies various language-processing techniques, such as, recognition of numbers and symbols with special meaning, to extract missing information from the description. As an example, some financial institutions provide an "incomplete" set of data elements and pack the remaining information into a description. The institution might report something like:

Trade date: Jan. 3, 2001
Settle date: Jan. 6, 2001
Ticker: QCOM
Description: Buy 100 shares @$65/share
Total: $6,500

In this example, transaction type, units/quantity and unit price are not provided as separate data elements, but are desired by a data model used by portfolio manager 10. The above description is broken into tokens "BUY", "100 SHARES", and "@ $65/SHARE". A dictionary can be used to identify "BUY" as an activity type, pattern matching and a dictionary can be used to identify "100 SHARES" as a quantity of 100, and more pattern matching can be used to identify "@ $65/SHARE" as a unit price of $65.

Free-text descriptions in context-free description interpreter 315 can be unlimited by nature, and a term may have several possible meanings, depending on context (e.g., the word "INCOME" may indicate an activity type, as in "INCOME RECEIVED", or may be part of a name, as in "GROWTH AND INCOME FUND"). A context-sensitive description interpreter (described below) can handle descriptions not handled by context-free description interpreter 315.

If data is not missing in step 310 or after context-free description interpreter 315 is engaged, a step 320 can be performed in which a determination is made as to whether there are multi-part values in the financial data. If multi-part values are present, a value combiner 325 is engaged. Value combiner 325 can handle the situation where a financial information source (e.g., a web site) divides totals into income and principal portions. These portions need to be combined to produce a total. Value combiner 325 can also handle the situations where a financial information source provides multiple activity descriptions. For example, a financial institution can present the transaction information provided in Table 2 below.

TABLE 2

| Transaction Type | Activity Type | Amount |
|---|---|---|
| Dividends/Gains | Cash Receipt | $17.50 |
| Dividends/Gains | Purchase | ($17.50) |
| Contributions | Cash Receipt | $50.00 |

Value combiner 325 can use a rule-based mechanism to take the "transaction type" information and the "activity type" information and produce a single type for each of the three transactions (e.g., Income, Buy, and Deposit, respectively). Value combiner 325 can also handle the situations, such as, a balance conflict by adding the OFX-specified elements of AVAILCASH and MARGINBALANCE together, watching for specific free-form balance entries and using these to adjust that result further (e.g., "MARGIN ACCOUNT EQUITY" is subtracted, adjusting for the use of MARGINBALANCE to report the total value of a margin account).

If there are not multi-part values in step 320 or after value combiner 325 is engaged, a data record filter 335 can be engaged. Records downloaded from financial institutions may hold transactions, but they also may hold summary information (e.g., subtotal/total rows, such as one might have in a spreadsheet) or status information (e.g., the only record in a table may be "system not available"). Data record filter 335 can use rules with a combination of statistics (e.g., does a record contain the elements "expected" based both on other records/column headers seen and on data model requirements) and a dictionary (e.g., does the record look like it refers to a known-to-be-uninteresting type of data) to eliminate records deemed to be of no value. At the same time, data record filter 335 can preserve status information, marking it as a "status" transaction (as opposed to balance, holding, or activity) so later processing can mark the account appropriately. Data record filter 335 results in filtered data 337.

Filtered data 337 and name/quote data 343 are provided to an equity identifier 345. Financial institutions identify instruments by Ticker, CUSIP (identification number selected by the Committee on Uniform Securities Identification Procedures), or name (which may be abbreviated) identifiers. The identification may be free-standing, or may be embedded in a free-text description. Equity identifier 345 is responsible for identifying the equity associated with a transaction. A CUSIP can look like quantities and other numerical values. It is used in the absence of a ticker and only if the CUSIP is clearly identified by the financial institution (via a label of some sort). Where a CUSIP is used, equity identifier 345 looks the CUSIP up in a database of equities and uses the resulting Ticker.

Equity identifier 345 can use a variety of techniques to identify an equity. For example, equity identifier 345 can check to determine whether the name is a ticker name or a name-in-database as well as checking the description contains a ticker or name-in-database. If an equity is not identified, equity identifier 345 can incorporate the institution's name (because mutual fund companies often do not include their name with the fund name, while the rest of the world does). For example, the SCUDDER Internet web site might list "Global Fund", while all non-SCUDDER sources call it "Scudder Global Fund".

Equity identifier 345 can use smart handling to identify situations where common names are used to identify instruments that do not correspond to what other sources would expect. For example, an insurance company may name a variable annuity after a mutual fund on which the annuity is based. A successful identification requires that the instrument's NAV (net asset value) correspond to the price reported by the financial institution (within tolerances) for a successful match. This identification technique can be expanded beyond mutual funds to any name to avoid potential incorrect identification from free-form names.

After equity identifier 345 is engaged, previous position data 353 and data from equity identifier 345 can be provided to a position identifier 355. Position identifier 355 can determine to which existing position in the data model of portfolio manager 10 a transaction corresponds. To do so, position identifier 355 can rely on equity-based and name-based matching.

After position identifier 355 is engaged, a context-sensitive description interpreter 365 can be engaged. Transactions with missing information and free-text descriptions can be interpreted again in light of the account's known positions. Context sensitive description interpreter 365 can compare the descriptions to the names of the account's positions (or the names/tickers of the associated equities) and attempt to find a point at which to break the description into components, much as numbers and special symbols were used in context-free description interpreter 315, described above. If the description can be broken down, similar techniques to those described earlier can be used to extract data values. Success may cause position identifier 355 to be re-engaged.

After context sensitive description interpreter 365 is engaged, a value adjuster 375 can be engaged. Value adjuster 375 can correct values (e.g., adjusting signage to conform to the data model) and supply missing values based on information in the transaction and knowledge of the equity. For example, given any two of unit price, quantity, and total, the missing element can be calculated. If unit price is missing but the equity is known, the unit price can be supplied.

After value adjuster 375 is engaged, a step 380 can be performed in which a decision is made whether a transaction identifier (ID) is missing. If the transaction ID is missing, a transaction ID generator 382 can be engaged. Transaction ID generator 382 generates a unique ID for the transaction by combining a representation of all of its data elements (e.g., date, amount, account, equity, etc.).

If the transaction ID is not missing or after the transaction ID generator 382 is engaged, a duplicate eliminator 385 can be engaged. Duplicate eliminator 385 can manage multiple copies of the same information. In the case of holding and balance information, duplicate eliminator 385 deletes any older information from the same day (holding information is not "final" until the close of the business day, so later information is better). In the case of activity information, duplicate eliminator 385 deletes the new copy, as the older copies will have been processed already, and the information about a transaction never changes (any changes are posted via "corrections", which are new transactions).

After duplicate eliminator 385 is engaged, a position adjuster 387 can be engaged. Position adjuster 387 can create, update, and/or delete positions based on the new transactions. Position adjuster 387 may also combine multi-part holdings into a single entity. Examples can include combining a trust's holding of a single equity reported as separate "principal" and "income" holdings into a single position, combining multiple pieces of an overall cash balance into a single balance representing all of the cash in the account, and combining holdings of a single equity bought using different techniques (e.g., bought using cash vs. bought on margin) into a single position.

After position adjuster 387 is engaged, a step 390 can be performed in which a determination is made as to whether a position in the data model of portfolio manager 10 is missing or, in other words, the position with which a transaction being processed is associated has not been identified. If a position is missing, an orphan handler 392 is engaged. It is possible that some transactions remain without having an identified position. Orphan handler 392 provides an attempt to assign these transactions to a position. In an exemplary embodiment, orphan handler 392 identifies transactions that do not carry equity information with them, checking their type for applicability to a cash transaction, and associating those transactions with the account's cash balance.

After orphan handler 392 is engaged, a step 393 can be performed in which a determination is made as to whether a position is discovered. If a position is discovered, context-sensitive description interpreter 365 is engaged. If a position is not discovered or if a position is not determined to be missing in step 390, a cash flow adjuster 395 can be engaged. The arrival of new transaction information may have implications on cash flows for various historical periods. Cash flow adjuster 395 can map newly processed transactions with non-neutral cash flow implications to the periods covering each transaction's date and recalculates the flow for that period. The result of cash flow adjuster 395 is personalized data 397. Personalized data 397 is used in the formation or updating of a financial portfolio file.

Advantageously, the financial portfolio integration process described with reference to FIG. 3 intelligently aggregates financial information into a financial portfolio. Such integration allows for inter-relationships among financial information to be established. Further, the integration provides an automated processing of financial information such that calculations, projections, and other operations can be performed on the data included in the information.

Figure 4:
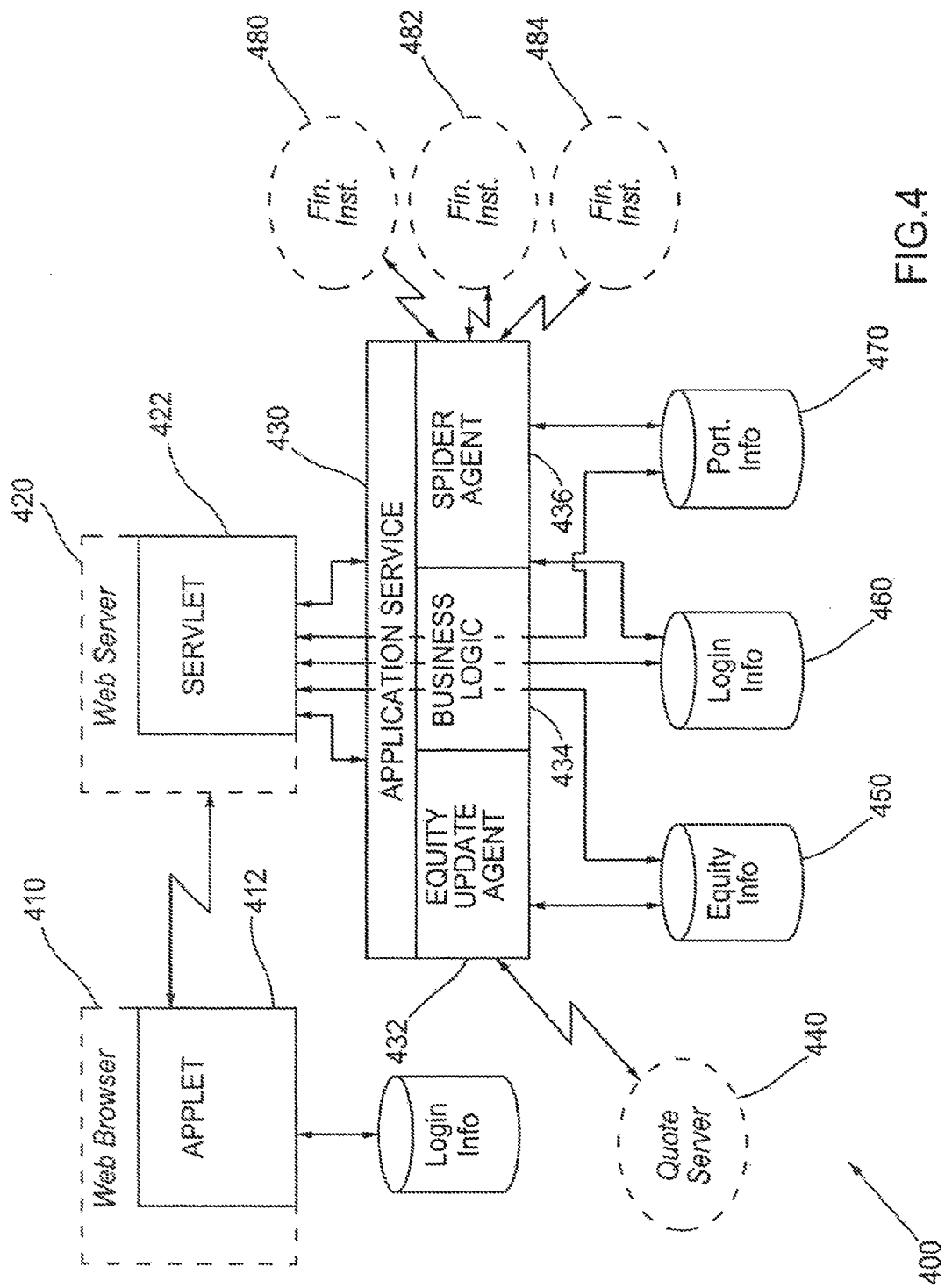
FIG. 4 is a general functional block diagram of exemplary operational components of the portfolio manager of FIG. 1.

FIG. 4 illustrates a general functional block diagram 400 of exemplary operational components of portfolio manager 10 described with reference to FIG. 1, in accordance with yet another exemplary embodiment. As shown in diagram 400, a web browser 410 can include an applet application 412. Applet application 412 is configured to communicate with a web server 420. In an exemplary embodiment, applet application 412 provides data presentation and user interaction and is written in the JAVA programming language.

Web server 420 can include a servlet application 422. Servlet application 422 is configured to communicate with an application service component 430. Servlet application 422 provides data access and request processing/dispatching by interacting with the client-side applet 412, and can be written in the JAVA programming language. Servlet application 422 can be accessed via a secure (HTTPS) uniform resource locator (URL), using Secure Sockets Layer (SSL) support of web server 420.

Application service component 430 can include an equity update agent 432, business logic 434, and a spider agent 436. Application service component 430 provides security and account data acquisition and interpretation. Equity update agent 432 can communicate with a quote server 440 and an equity information database 450. Equity update agent 432 is a module responsible for interacting with third party quote service to obtain security information. Quote server 440 is a server computer which is configured to provide equity pricing information (e.g., information obtained from financial exchanges and other third party data providers). Equity information database 450 is a database that contains information on equity (e.g., stock, bond, mutual funds) obtained from third party quote services.

Business logic 434 can communicate with equity information database 450, a login information database 460, and a portfolio information database 470. Business logic 434 is a module responsible for performing transaction interpretation, rate of return calculations, and any other data processing required by portfolio manager 10. Login information database 460 is a database which contains login identifications and passwords/PINs, obtained from users, for each on-line account, if the user opts to allow portfolio manager 10 to gather and update account information automatically. Portfolio information database 470 is a database which contains user and portfolio information, populated with a combination of user-supplied information, data obtained from financial institutions, and results of calculations made by business logic 434. Spider agent 436 can communicate with portfolio information database 470 and financial institutions 480, 482, and 484. In an exemplary embodiment, spider agent 436 is a module responsible for crawling financial institution sites for account data.

In an exemplary embodiment, the following scenarios are illustrative of the interaction of components of portfolio manager 10 during operation. Servlet application 422 can receive a user registration request either from applet application 412 or from a separate vendor web page. Servlet application 422 connects to the login information database 460 to create an account for the client. If this request does not come directly from the client, the password is pre-expired. The client can request creation of a portfolio, or registration of an account, while running applet application 412. Applet application 412 collects all required information and sends the information along with a "stored new data" request to servlet application 422. Servlet application 422 receives the request and its information and hands the package off to a new thread. This thread stores the information in the login information database 460 and portfolio information database 470.

In an exemplary embodiment, if the user is registering an account and opts not to have a personal identification number (PIN) information stored by server 420, the login information is not transmitted to server 420, but rather is stored locally by applet application 412.

In an exemplary embodiment, nightly spidering takes place on behalf of all clients, without a specific client request to drive it. Application service component 430 maintains a spidering schedule. When the time arrives for nightly spidering, spider agent 436 of application service component 430, first, finds the accounts it is to handle; second, consults login information database 460 and makes a list of those accounts for which it also has login information; and third, distributes this list among a set of spidering threads.

Each spidering thread connects to the appropriate financial institution, performs a log-in procedure using the login information supplied to it, and then downloads the information for the specified account. The results are handed off to a data parser that interprets the downloaded data and writes transaction and holding information to portfolio information database 470. Once information from an account has been updated, spider agent 436 notifies business logic 434, which looks up the account (from portfolio information database 470), processes any newly downloaded transactions, and writes the results of its calculations back to portfolio information database 470. Business logic 434 also evaluates any alerts associated with the portfolio of the account and generates and delivers any required electronic mail by contacting a SMTP server to do so.

In an exemplary embodiment where spidering is initiated upon a request by the client and PIN information is located on the server, the following may be performed. Where the client is working in applet application 412 and requests and an account update, applet application 412 checks the PIN storage policy of the client, sees that PINs are stored on the server, and sends an "on-demand spidering" request to servlet application 422, identifying the client who's accounts are to be spidered. Servlet application 422 hands this package to a new thread, which simply passes the request and its parameters through to application service component 430. The thread of servlet application 422 sends an acknowledgement back to applet application 412 and issues a periodic series of "progress" responses based on information it gets periodically from application service component 430. Spider agent 436 identifies that the request contains no account or login information and looks up the information from login information database 460 and portfolio information database 470. Processing then proceeds as it does during nightly spidering.

In an exemplary embodiment where the client requests spidering and PINs are located on the client, applet application 412 checks a list of client account information, looks up login and PIN information from a local database or memory device. Applet application 412 then sends this full list and an "on-demand spidering" request to servlet application 422. Servlet application 422 handles this request the same way it handles other on-demand spider requests.

Figure 5:
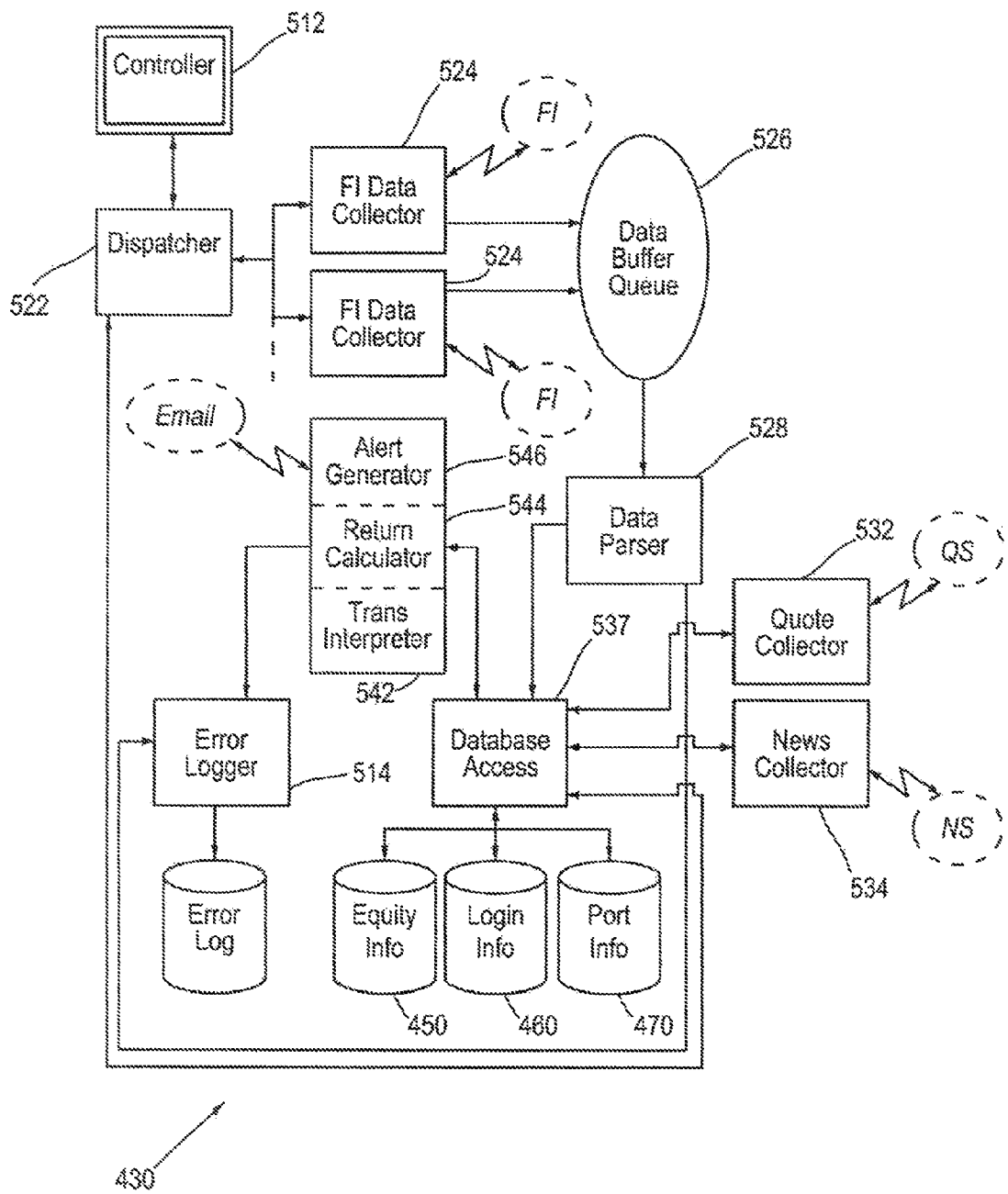
FIG. 5 is a general functional block diagram of an exemplary embodiment of an application service component of the portfolio manager of FIG. 1.

FIG. 5 illustrates a general functional block diagram 500 of an exemplary embodiment of application service component 430 described with reference to FIG. 4. Application service component 430 includes a main server, spider agent, equity update agent, and business logic. The main server can include a controller 512 and an error logger 514. Spider agent can include a dispatcher 522, financial institution (FI) data collectors 524, a data buffer queue 526, and a data parser 528. The equity update agent can include a quote collector 532 and a news collector 534. The business logic can include a transaction interpreter 542, a return calculator 544, and an alert generator 546.

Controller 512 handles update scheduling and on-demand processing requests, passing them along to the appropriate component to which the requests correspond. Error logger 514 generates an error notification, which is a service available to all components of application service component 430. Dispatcher 522 accepts spidering requests from controller 512. Dispatcher 522 starts and monitors H data collector 524 for each financial institution and/or account involved, eliminating the number of concurrent threads based on server parameters. Dispatcher 522 reads information from a login information database and passes this information to FI collectors 524. Dispatcher 522 also accepts log-in information passed from an applet application using a local PIN database through the servlet application to application service component 430.

FI data collectors 524 are responsible for contacting a financial institution and downloading account data as requested by dispatcher 522. FI data collectors 524 build a buffer of raw data and place it on data buffer queue 526. Several FI data collectors 524 may be active at the same time. Data buffer queue 526 serves as a coordination point between FI data collectors 524 which fill queue 526 and data parser 528, which empties queue 526. In an exemplary embodiment, data buffer queue 526 is an in-memory, thread-safe repository of data buffers. Data parser 528 is responsible for translating raw financial institution data and turning it into data objects and records with a common format and storing the results in a database.

Quote collector 532 is responsible for interacting with a third party quote service, such as, North American Quotations of London, Ontario, Canada, to gather security information and update records in the equity information database 450. News collector 534 is responsible for interacting with a third party news service, such as Reuters, gathering articles and news releases and updating records in equity information database 450.

Transaction interpreter 542 is responsible for reading unprocessed transactions from portfolio information database 470 and using this information to adjust holding information, such as cost basis, and numbers of shares, and writing any results back to portfolio information database 470. Transaction interpreter 542 may consult the security information database for information about securities referred to by the transactions. To avoid the performance hit of polling for unprocessed transactions, the database access responsible for creating an unprocessed transaction "pings" or sends a communication to the transaction interpreter 542 to let it know there are transactions to be processed. Return calculator 544 is responsible for calculating internal rates of return for holdings and portfolios. Return calculator 544 reads information from both portfolio information database 470 and equity information database 450 and updates portfolio information database 470. Information from databases 450, 460 and 470 can be accessed through a database access 537. Alert generator 546 is responsible for evaluating portfolio and holding changes and generating alerts. Alerts can be stored in portfolio information database 470 and are also sent to an SMTP mail server for delivery as e-mail messages.

Figure 6:
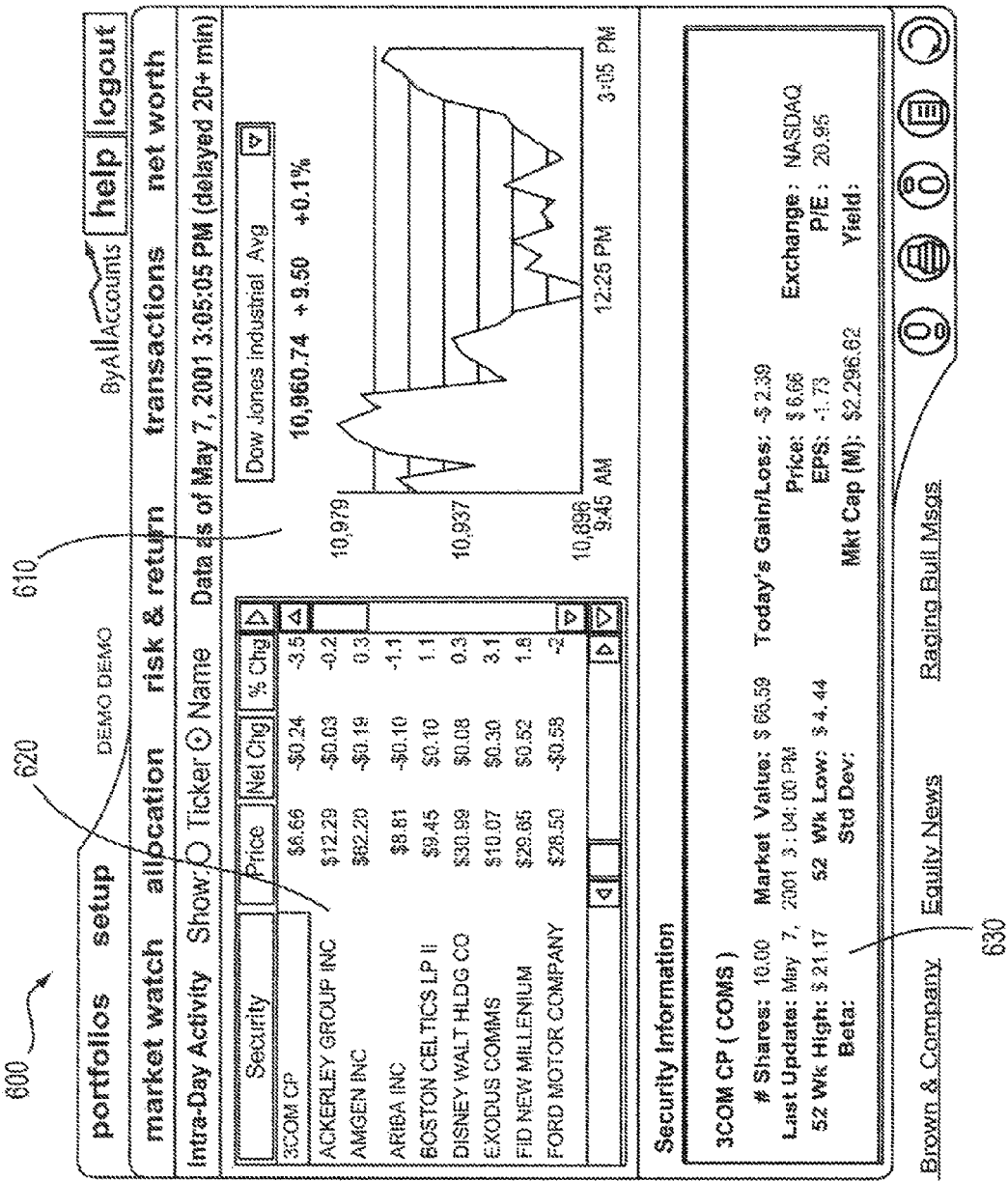
FIG. 6 is an exemplary user interface display conveying information from the portfolio manager of FIG. 1.

FIG. 6 illustrates an exemplary user interface display 600 conveying information from portfolio manager 10 (FIG. 1). Display 600 includes information associated with financial markets, such as, the Dow Jones Industrial Average market index. Display 600 also includes information regarding specific stocks held by the client or being watched by the client. Further, display 600 includes information regarding fundamentals and alerts specific to a selected stock.

In an exemplary embodiment, display 600 includes a section 610 depicting a graphical representation of financial market information. A section 620 can include a list of security holdings arranged by ticker symbol, including the security price daily change, and volume of transactions in the financial market. A section 630 in display 600 shows additional information about a particular security selected in section 620.

Figure 7:
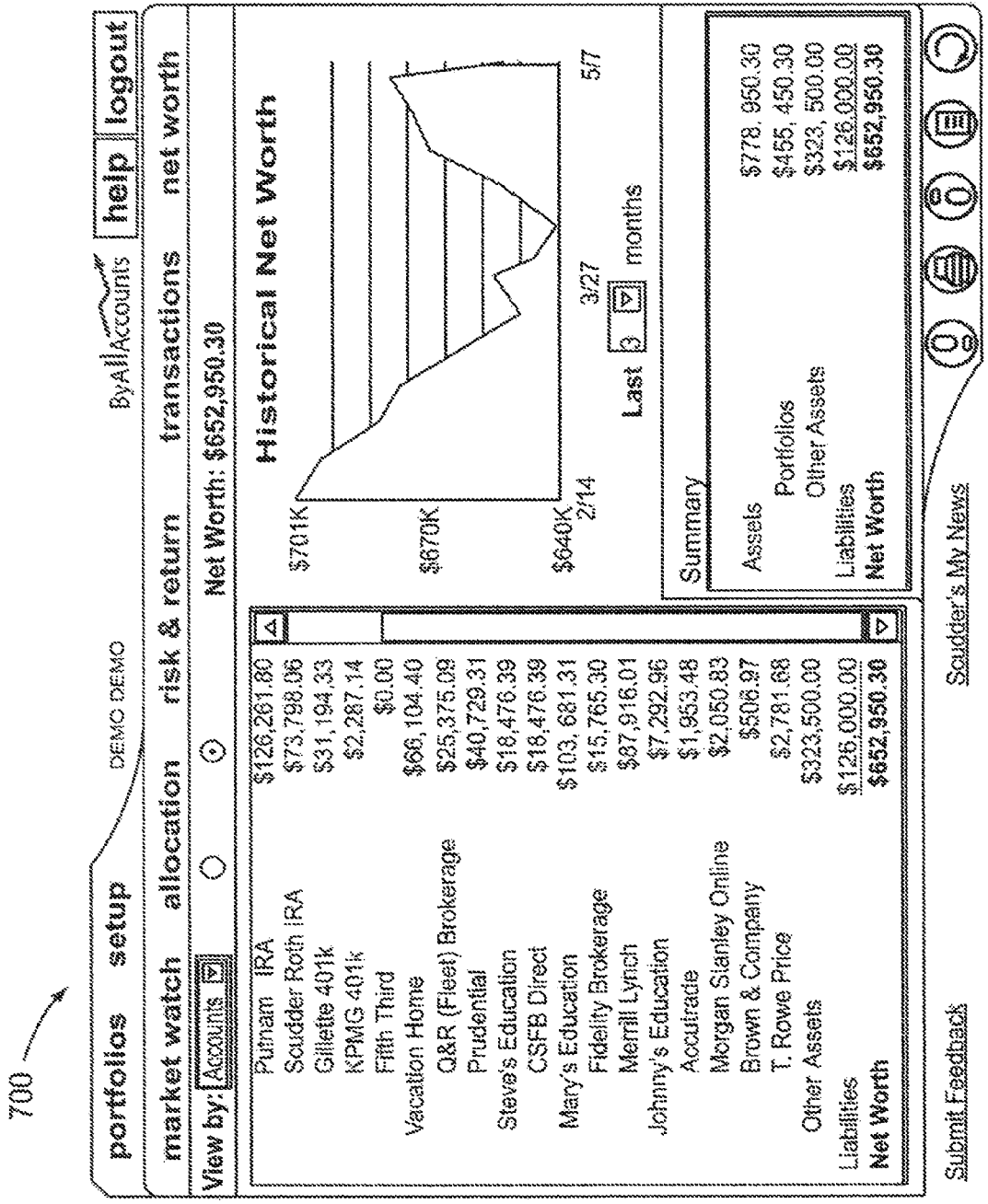
FIG. 7 is an exemplary user interface display conveying information from the portfolio manager of FIG. 1.

FIG. 7 illustrates an exemplary user interface display 700 conveying information from portfolio manager 10 (FIG. 1). Display 700 provides information regarding total net worth of the client. Total net worth can include information regarding the total value of each portfolio and account, the value of any other assets the client may hold, and the amount of any liabilities owed by the client. Further, display 700 can include a graph of the client's net worth as it changes over time, as well as detailed information regarding values of specific holdings, values of asset classes of holdings, and values of asset subclasses of holdings within accounts and portfolios.

Figure 8:
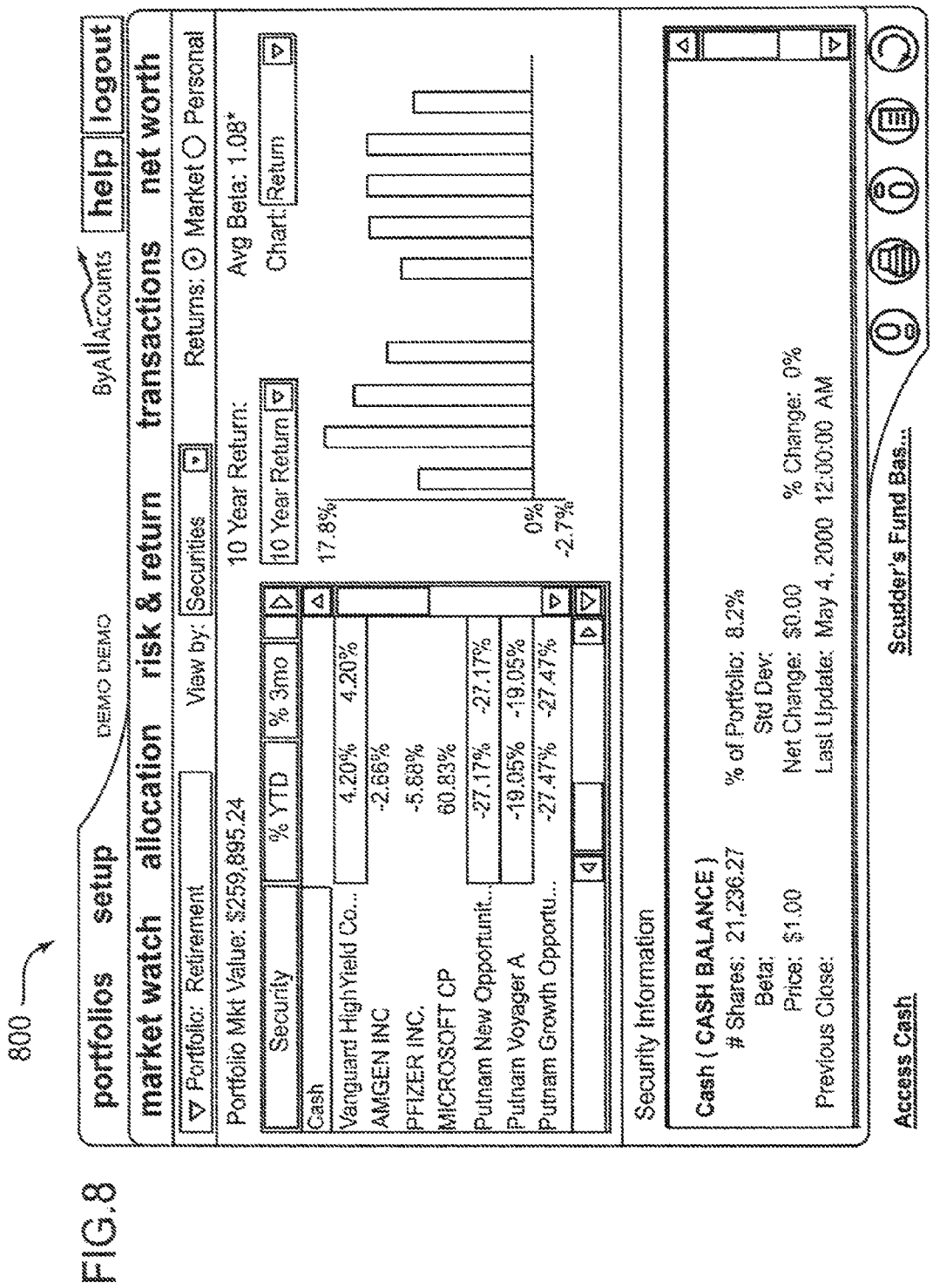
FIG. 8 is an exemplary user interface display conveying information from the portfolio manager of FIG. 1.

FIG. 8 illustrates an exemplary user interface display 800 conveying information from portfolio manager 10 (FIG. 1). Display 800 displays information regarding the risk and return for selected holdings in the portfolio of the client. Risk and return can be shown in display 800 graphically as well as textually.

Figure 9:
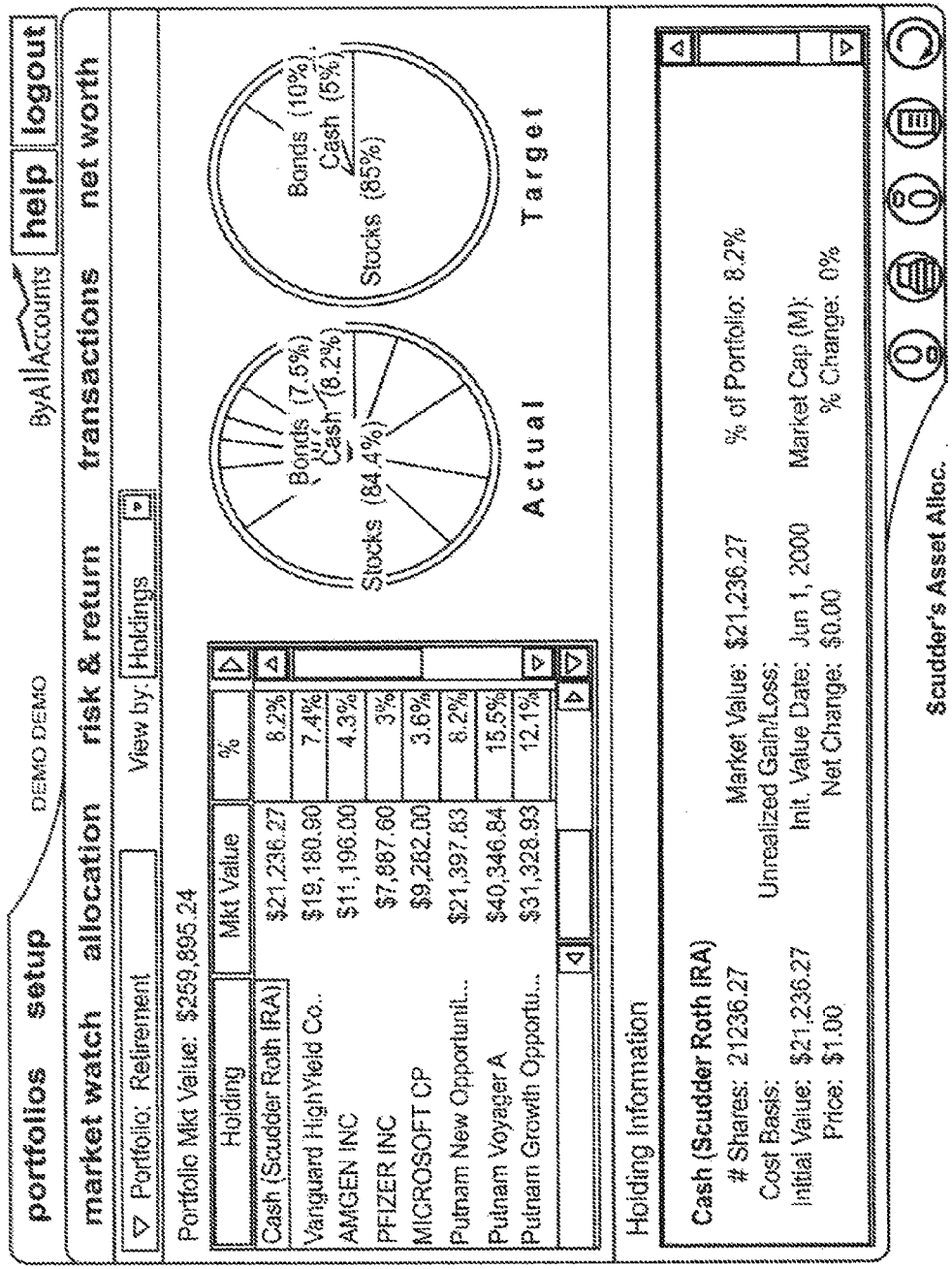
FIG. 9 is an exemplary user interface display conveying information from the portfolio manager of FIG. 1.

FIG. 9 illustrates an exemplary user interface display 900 conveying information from portfolio manager 10 (FIG. 1). Display 900 includes information on a financial portfolio.

Display 900 also includes a graphical display of actual value and target value for the portfolio.

FIG. 10 illustrates an exemplary user interface display 1000 conveying information from portfolio manager 10 (FIG. 1). Display 1000 includes information on transactions for a financial portfolio. Display 900 also includes transaction details for a selected transaction.

Figure 11:
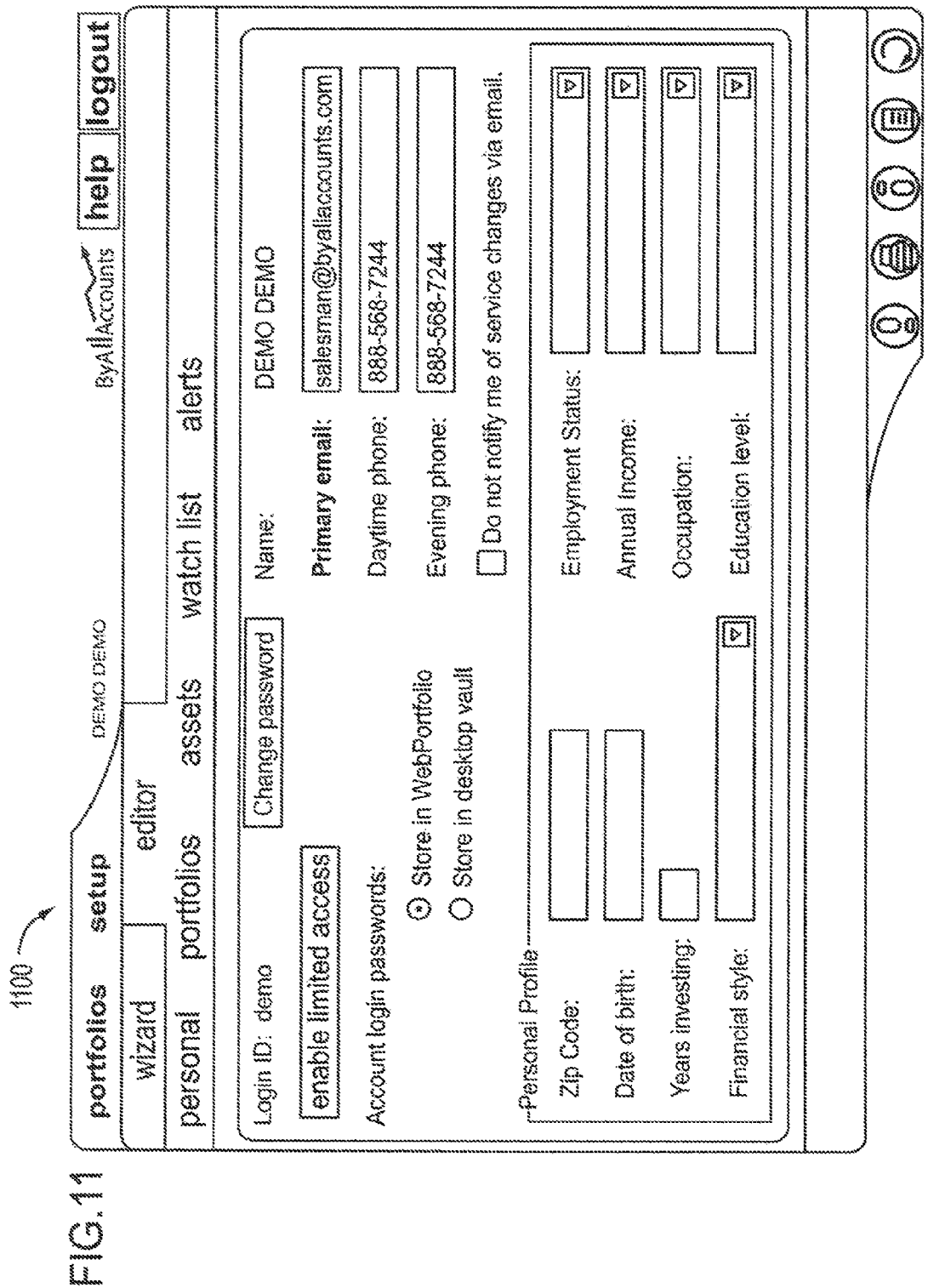
FIG. 11 is an exemplary user interface display conveying information from the portfolio manager of FIG. 1.

FIG. 11 illustrates an exemplary user interface display 1100 conveying information from portfolio manager 10 (FIG. 1). Display 1100 includes set up information for a financial portfolio. Display 1100 also provides for the input of personal information from the user of portfolio manager 10.

Figure 12:
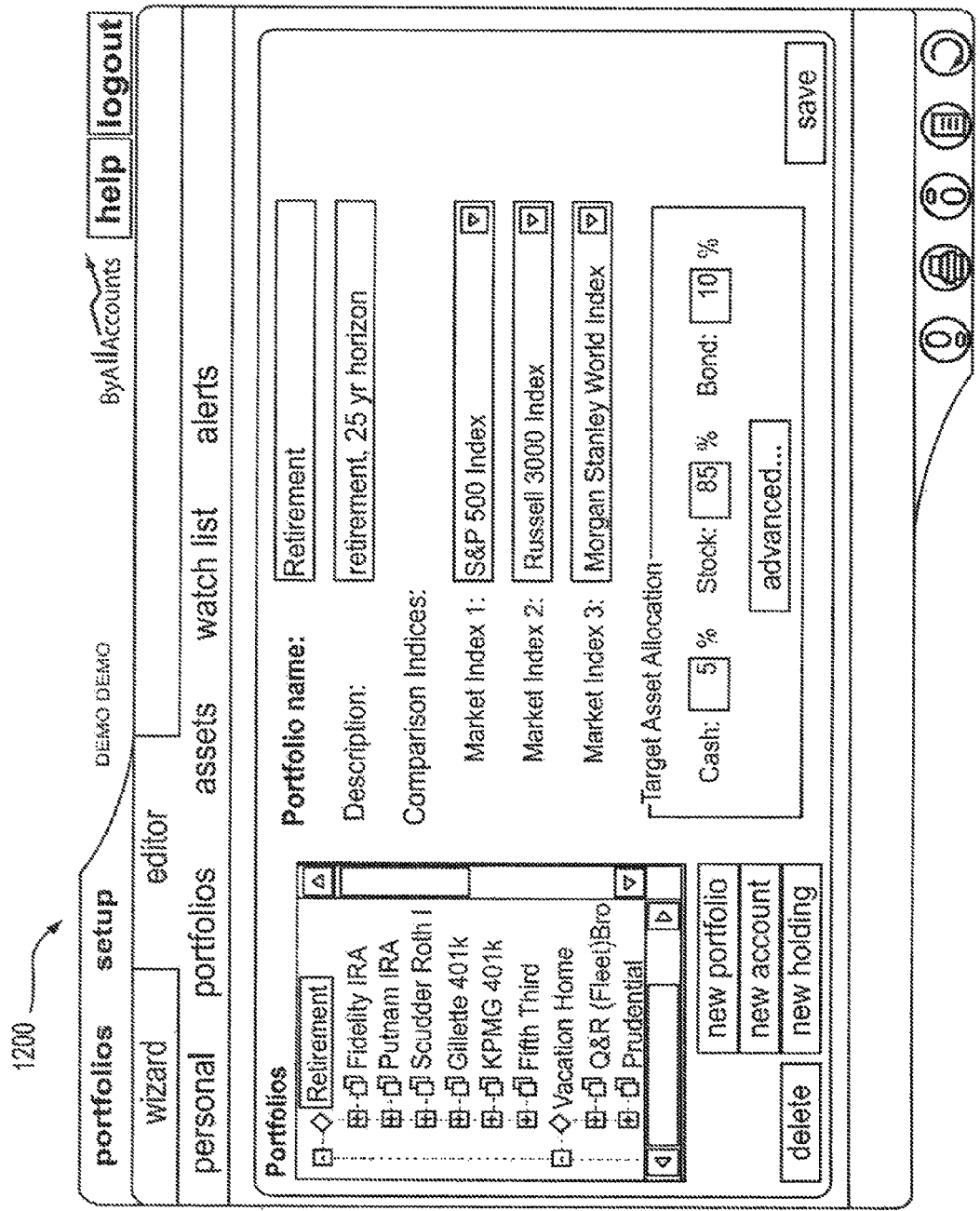
FIG. 12 is an exemplary user interface display conveying information from the portfolio manager of FIG. 1.

FIG. 12 illustrates an exemplary user interface display 1200 conveying information from portfolio manager 10 (FIG. 1). Display 1200 includes set up information for a financial portfolio. Display 1100 also provides for the selection, creation, and comparison of portfolios from the user of portfolio manager 10.

Figure 13:
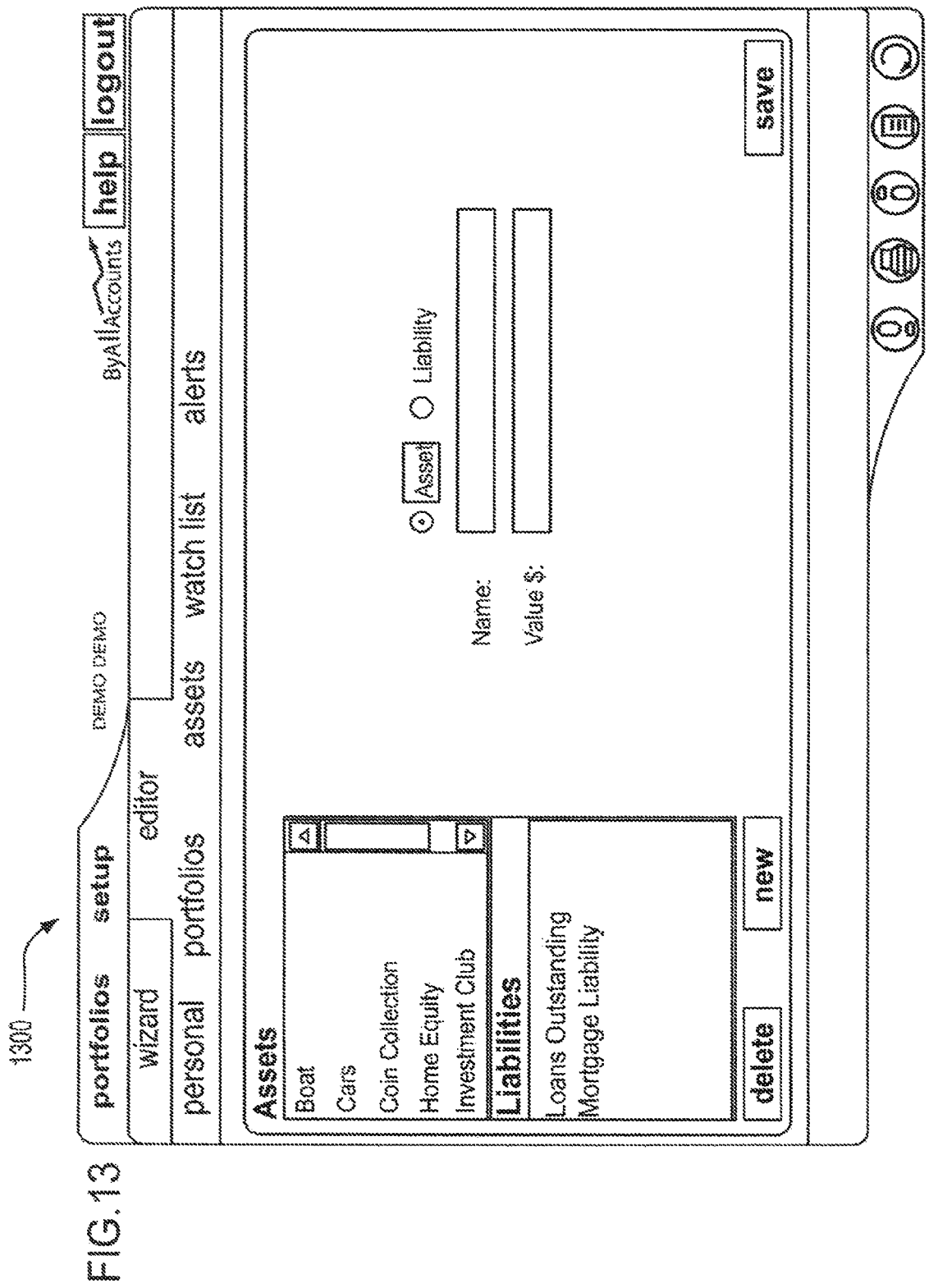
FIG. 13 is an exemplary user interface display conveying information from the portfolio manager of FIG. 1.

FIG. 13 illustrates an exemplary user interface display 1300 conveying information from portfolio manager 10 (FIG. 1). Display 1300 includes set up information for a financial portfolio. Display 1300 provides for the input of assets and liabilities in a portfolio from the user of portfolio manager 10.

Figure 14:
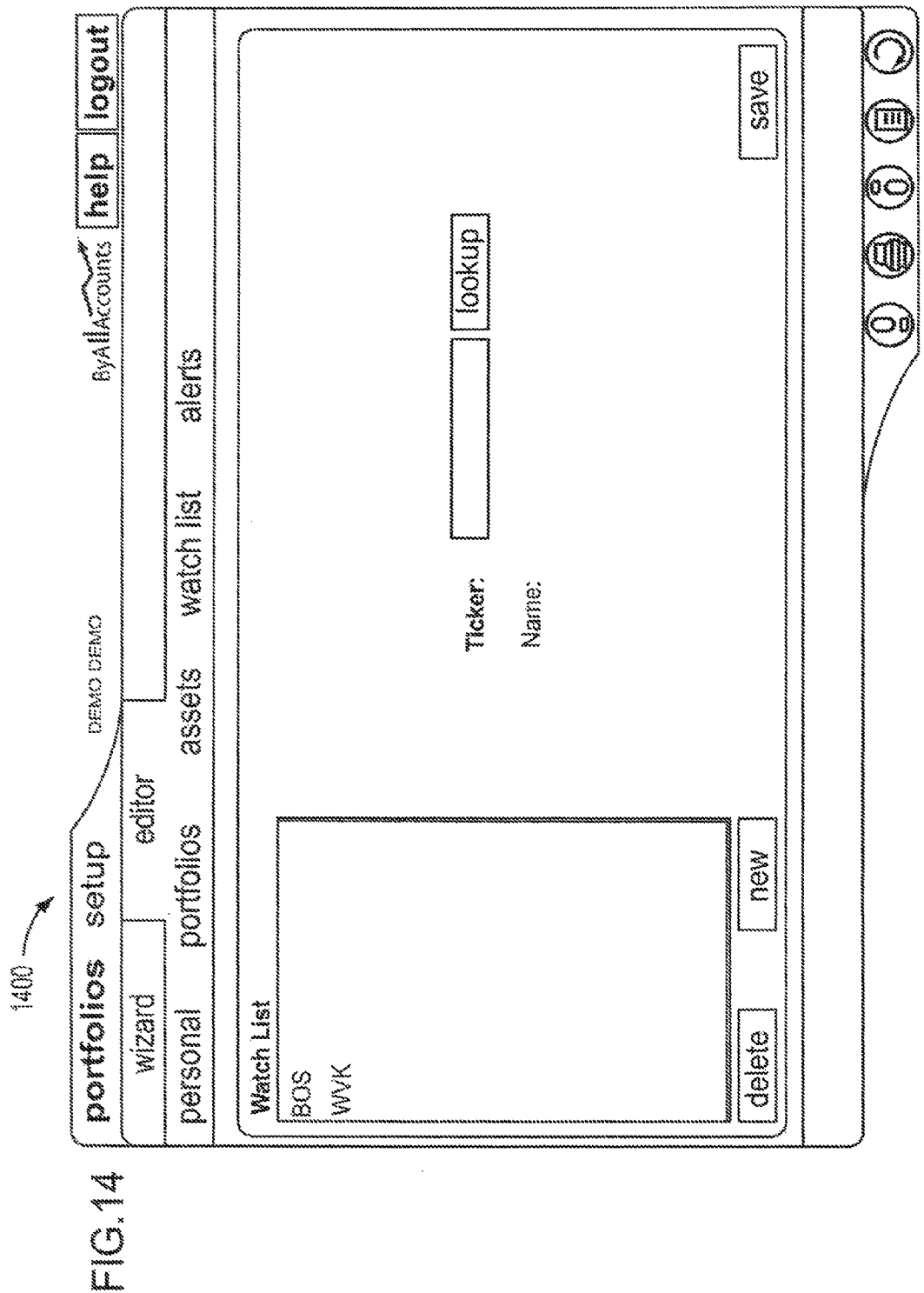
FIG. 14 is an exemplary user interface display conveying information from the portfolio manager of FIG. 1.

FIG. 14 illustrates an exemplary user interface display 1400 conveying information from portfolio manager 10 (FIG. 1). Display 1400 includes set up information for a financial portfolio. Display 1400 provides for the input of ticker names to watch from the user of portfolio manager 10.

FIG. 15 illustrates an exemplary user interface display 1500 conveying information from portfolio manager 10 (FIG. 1). Display 1500 includes set up information for a financial portfolio. Display 1500 provides for the input of financial alerts from the user of portfolio manager 10.

Figure 16:
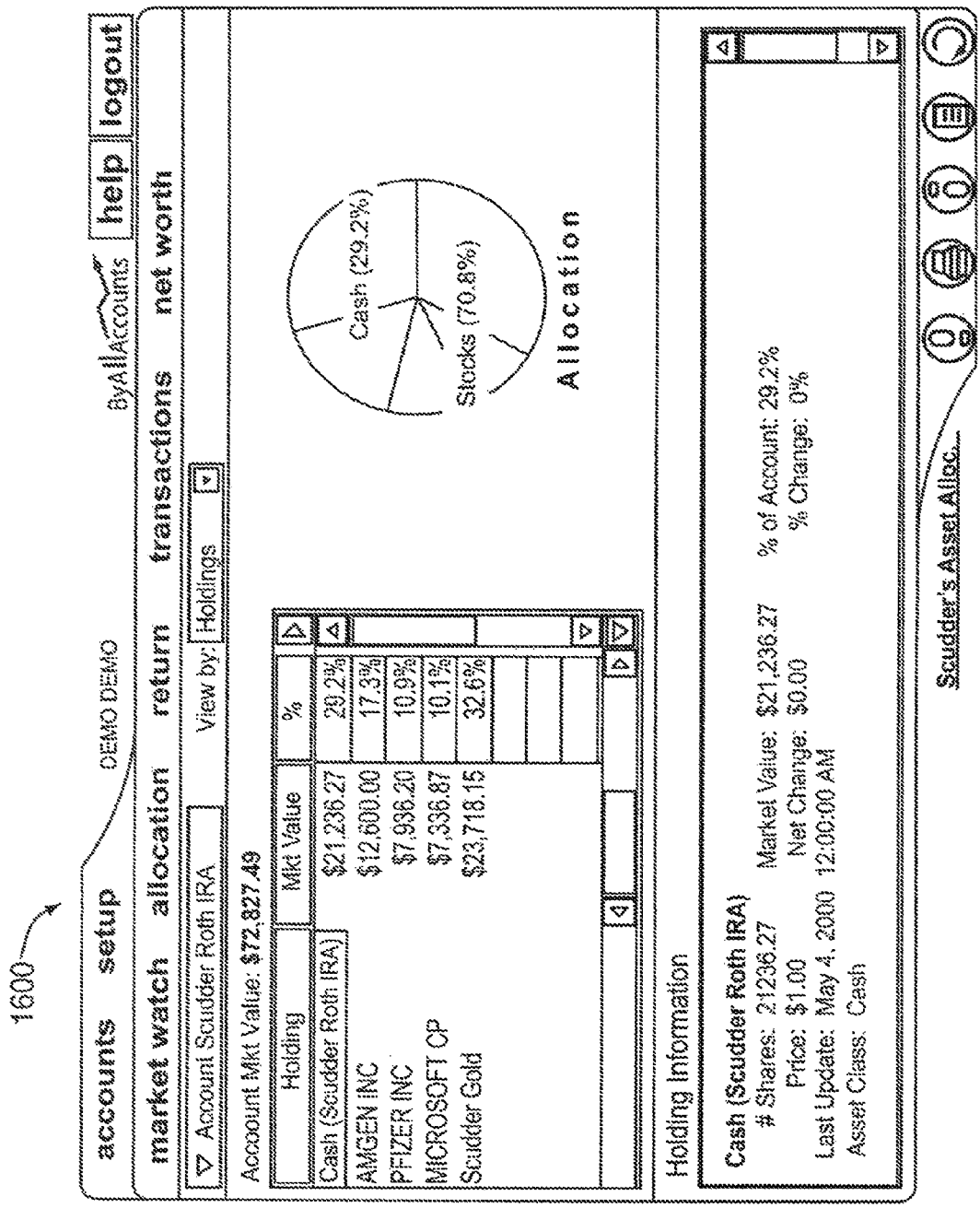
FIG. 16 is an exemplary user interface display conveying information from the portfolio manager of FIG. 1.

FIG. 16 illustrates an exemplary user interface display 1600 conveying information from portfolio manager 10 (FIG. 1). Display 1600 includes basic holding information for a financial portfolio. Display 1600 provides a graphical and numerical representation of holdings allocations in the financial portfolio.

Figure 17:
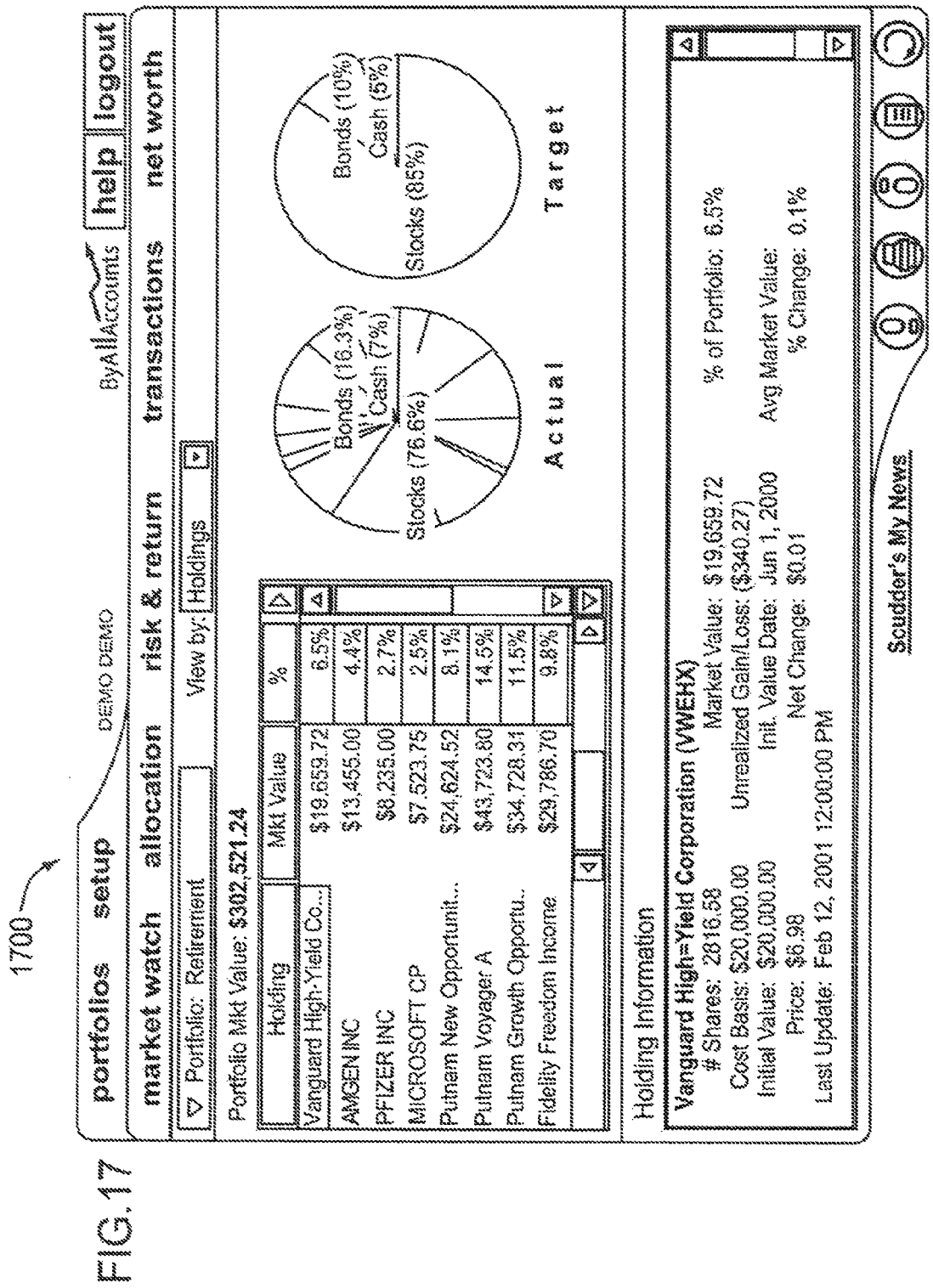
FIG. 17 is an exemplary user interface display conveying information from the portfolio manager of FIG. 1.

FIG. 17 illustrates an exemplary user interface display 1700 conveying information from portfolio manager 10 (FIG. 1). Display 1700 includes more detailed holding information for a financial portfolio than display 1600 described with reference to FIG. 16. Display 1700 provides a graphical and numerical representation of holdings allocations as well as target allocations for a financial portfolio.

Advantageously, portfolio manager 10 provides total information access, bringing all customer financial data from any bank, brokerage, or other institution in one place. Further, portfolio manager 10 makes it easy for customers to see their portfolio performance at any time with automatic updates. Portfolio manager 10 allows customers to customize and organize portfolios and help understand risk and return with advanced analysis tools. Further, portfolio manager 10 helps attract and retain key customers with the added value of portfolio manager 10. Portfolio manager 10 allows customers co-branding and custom links to products and services available from specific financial institutions.

Portfolio manager 10 can include the ability to share data at two levels, such as, at a client level and at a financial intermediary level. At a client level, portfolio manager 10 provides individuals with financial information that may be from multiple financial sources. At an intermediary level, such as brokers, financial advisors, and accountants, portfolio manager 10 provides financial services intermediaries with a tool for assisting customers in the management of their financial portfolio.

Advantageously, customers can track all of their assets and liabilities and monitor their net worth in one place. Portfolio manager 10 helps customers to set and monitor personal investment goals. Portfolio manager 10 assists in evaluating return relative to risk information, allowing customers to make smarter decisions on investments.

While the exemplary embodiments illustrated in the figures and described above are presently preferred, it should be understood that these embodiments are offered by way of example only. Other embodiments may include, for example, a wide variety of ways to convey financial portfolio information, such as, wireless application protocol (WAP), personal digital assistant (PDA) protocols, and other presentation means. Further, while exemplary embodiments describe the invention in the context of financial assets, the invention may extend to other assets or other items which can be organized into a portfolio. The invention is not limited to a particular embodiment, but extends to various modifications, combinations, and permutations that nevertheless fall within the scope and spirit of the appended claims.

What is claimed is:

1. A system for manipulating financial information, comprising:
    a central processing unit (CPU); and
    a storage device coupled to the CPU and having stored there information for configuring the CPU to:
        retrieve financial information of a customer by connecting over a network to each of two or more unrelated financial institutions, at least one of the two or more unrelated financial institutions storing its financial information in a data format different than at least one other of two or more unrelated financial institutions stores its financial information;
        for each of two or more unrelated financial institutions, normalize the retrieved financial information into a single normalized data format by assigning each piece of the customer's retrieved financial information to a different position in a stored data model; and
        generate a financial portfolio by aggregating financial information.

2. The system of claim 1 wherein the aggregating comprises applying at least one language-processing technique to address one or more missing pieces of financial information.

3. The system of claim 2 wherein the at least one language-processing technique comprises a context-free analysis or a context-sensitive analysis.

4. The system of claim 1 wherein the aggregating comprises identifying and interpreting the retrieved financial information.

5. The system of claim 2 wherein the aggregating further comprises identifying and interpreting the retrieved financial information and the addressed one or more pieces of financial information.

6. The system of claim 1 wherein the aggregating comprises combining two or more pieces of financial information into a single piece of financial information.

7. The system of claim 1 wherein the network is the Internet and wherein the retrieving includes the use of a secure communication protocol.

8. The system of claim 1 wherein the retrieving includes at least one of web crawling, parsing, and spidering technology.

9. The system of claim 1 wherein the retrieving includes automatically performing a login procedure for at least one of the two or more unrelated financial institutions and downloading information from each of the two or more unrelated financial institutions.

10. The system of claim 1 further configuring the CPU to receive a communication from a client computer to initiate a display of at least some of the generated financial portfolio.

11. The system of claim 7 further configuring the CPU to communicate the at least some of the generated financial portfolio to the client computer for display to a client as text and graphics.

12. A computer-readable medium storing software code representing instructions that when executed by a computing system cause the computing system to perform a method of manipulating financial information, the method comprising:
retrieving financial information of a customer by connecting over a network to each of two or more unrelated financial institutions, at least one of the two or more unrelated financial institutions storing its financial information in a data format different than at least one other of two or more unrelated financial institutions stores its financial information;
for each of the two or more unrelated financial institutions, normalizing the retrieved financial information into a single normalized data format by assigning each piece of the customer's retrieved financial information to a different position in a stored data model; and
generating a financial portfolio by aggregating financial information.

13. The computer-readable medium of claim 12 wherein the aggregating step comprises applying at least one language-processing technique to address one or more missing pieces of financial information.

14. The system of claim 13 wherein the at least one language-processing technique comprises a context-free analysis or a context-sensitive analysis.

15. The system of claim 12 wherein the aggregating step comprises identifying and interpreting the retrieved financial information.

16. The system of claim 13 wherein the aggregating step further comprises identifying and interpreting the retrieved financial information and the addressed one or more pieces of financial information.

17. The system of claim 12 wherein the aggregating step comprises combining two or more pieces of financial information into a single piece of financial information.

18. The computer-readable medium of claim 12 wherein the network is the Internet and wherein the retrieving step includes the use of a secure communication protocol.

19. The computer-readable medium of claim 12 wherein the retrieving step includes at least one of web crawling, parsing, and spidering technology.

20. The computer-readable medium of claim 12 wherein the retrieving step includes automatically performing a login procedure for at least one of the two or more unrelated financial institutions and downloading information from each of the two or more unrelated financial institutions.

21. The computer-readable medium of claim 12 wherein the method further comprises receiving a communication from a client's computer to initiate the displaying.

22. The computer-readable medium of claim 21 wherein the method further comprises communicating the at least some of the generated financial portfolio to the client's computer for display to a client as text and graphics.

23. A system for manipulating financial information, comprising:
a central processing unit (CPU); and
a storage device coupled to the CPU and having stored there information for configuring the CPU to:
retrieve financial information of a customer by connecting over a network to each of two or more unrelated financial institutions, at least one of the two or more unrelated financial institutions storing its financial information in a data format different than at least one other of two or more unrelated financial institutions stores its financial information;
for each of two or more unrelated financial institutions, normalize the retrieved financial information; and
generate a financial portfolio by aggregating financial information, the aggregating comprises applying at least one language-processing technique to address one or more missing pieces of financial information.

24. The system of claim 23 wherein the normalizing includes normalizing the retrieved financial information into a single normalized data format by assigning each piece of the customer's retrieved financial information to a different position in a stored data model.

25. The system of claim 23 wherein the at least one language-processing technique comprises a context-free analysis or a context-sensitive analysis.

26. The system of claim 23 wherein the aggregating further comprises identifying and interpreting at least one of the retrieved financial information and the addressed one or more pieces of financial information.

27. The system of claim 23 wherein the aggregating further comprises combining two or more pieces of financial information into a single piece of financial information.

28. The system of claim 23 wherein the network is the Internet and wherein the retrieving includes the use of a secure communication protocol.

29. The system of claim 23 wherein the retrieving includes at least one of web crawling, parsing, and spidering technology.

30. The system of claim 23 wherein the retrieving includes automatically performing a login procedure for at least one of the two or more unrelated financial institutions and downloading information from each of the two or more unrelated financial institutions.

31. The system of claim 23 further configuring the CPU to receive a communication from a client computer to initiate a display of at least some of the generated financial portfolio.

32. The system of claim 23 further configuring the CPU to communicate the at least some of the generated financial portfolio to the client computer for display to a client as text and graphics.

* * * * *